(12) United States Patent
Frey et al.

(10) Patent No.: US 12,352,863 B2
(45) Date of Patent: Jul. 8, 2025

(54) DETECTION DEVICE AND ASSOCIATED LIDAR SYSTEM

(71) Applicant: COMMISSARIAT A L'ENERGIE ATOMIQUE ET AUX ENERGIES ALTERNATIVES, Paris (FR)

(72) Inventors: Laurent Frey, Grenoble (FR); Anis Daami, Grenoble (FR); Stéphane Fanget, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 1073 days.

(21) Appl. No.: 17/316,600

(22) Filed: May 10, 2021

(65) Prior Publication Data

US 2021/0364641 A1 Nov. 25, 2021

(30) Foreign Application Priority Data

May 20, 2020 (FR) ...................................... 2005186

(51) Int. Cl.
*G01S 17/89* (2020.01)
*G01S 7/481* (2006.01)
*G02B 6/42* (2006.01)

(52) U.S. Cl.
CPC ............ *G01S 17/89* (2013.01); *G01S 7/4814* (2013.01); *G01S 7/4816* (2013.01); *G02B 6/4206* (2013.01)

(58) Field of Classification Search
None
See application file for complete search history.

(56) References Cited

U.S. PATENT DOCUMENTS 9,826,214 B2 11/2017 Cohen et al.
2016/0377721 A1* 12/2016 Lardin .................... G01S 17/58
356/5.09
(Continued)

FOREIGN PATENT DOCUMENTS

JP 2016-105082 A 6/2016

OTHER PUBLICATIONS

Wang, et al., "Performance of High-Speed Reconfigurable Free-Space Card-to-Card Optical Interconnects Under Air Turbulence", Journal of Lightwave Technology, vol. 31, Issue 11, pp. 1687-1693, 2013.

(Continued)

*Primary Examiner* — Eric L Bolda
(74) *Attorney, Agent, or Firm* — BakerHostetler

(57) ABSTRACT

A detection device for a coherent lidar imaging system includes an integrated detector comprising a matrix array of pixels distributed over N columns and M rows and comprising an optical guide, called reference guide, configured so as to receive a laser beam, called reference beam, N optical guides, called column guides, coupled to the reference guide, each column guide being coupled to M optical guides, called row guides, the M row guides being configured so as to route part of the reference beam into each pixel of the column, called pixel reference beam, each pixel of the integrated detector comprising: a guided photodiode coupled to an optical detection guide, a diffraction grating, called pixel grating, configured so as to couple a portion of a beam illuminating the pixel into the guided photodiode, a coupler, called pixel coupler, configured so as to couple the pixel coupled beam and at least a fraction of the pixel reference beam into the detection guide, an electronic readout and preprocessing circuit.

22 Claims, 18 Drawing Sheets

(56) References Cited

U.S. PATENT DOCUMENTS

2019/0391243 A1* 12/2019 Nicolaescu ............. G01S 17/42
2020/0124711 A1*  4/2020 Rezk ..................... G01S 7/4811
2020/0256995 A1   8/2020 Inoue et al.
2021/0055694 A1*  2/2021 Chan ..................... G03H 1/2645
2022/0390578 A1* 12/2022 Chan ...................... G01S 17/32

OTHER PUBLICATIONS

Aflatouni, et al., "Nanophotonic coherent imager", Optics Express, vol. 23, No. 4, pp. 5117-5125, 2015.
Martin, et al., "Photonic Integrated Circuit-Based FMCW Coherent LiDAR", Journal of Lightwave Technology, vol. 36, Issue 19, pp. 4640-4645, Oct. 1, 2018.

* cited by examiner

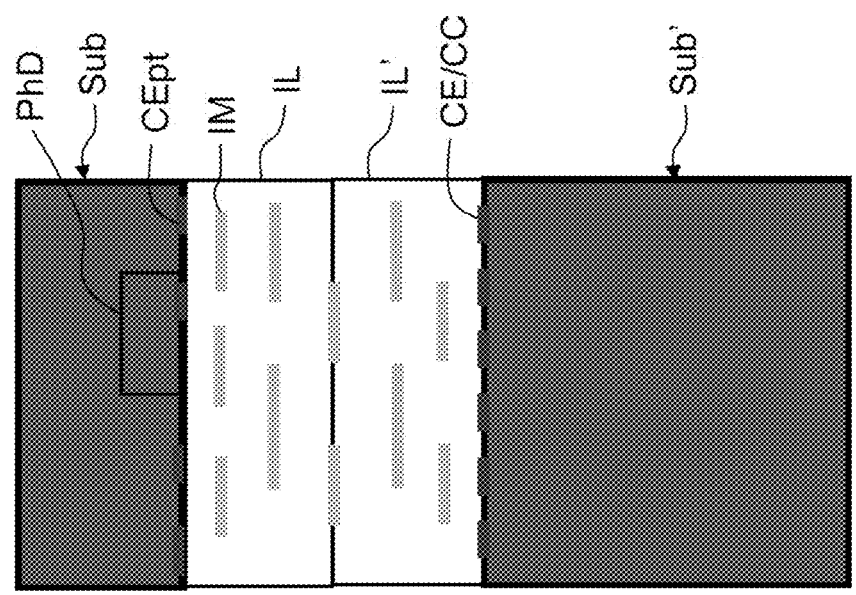
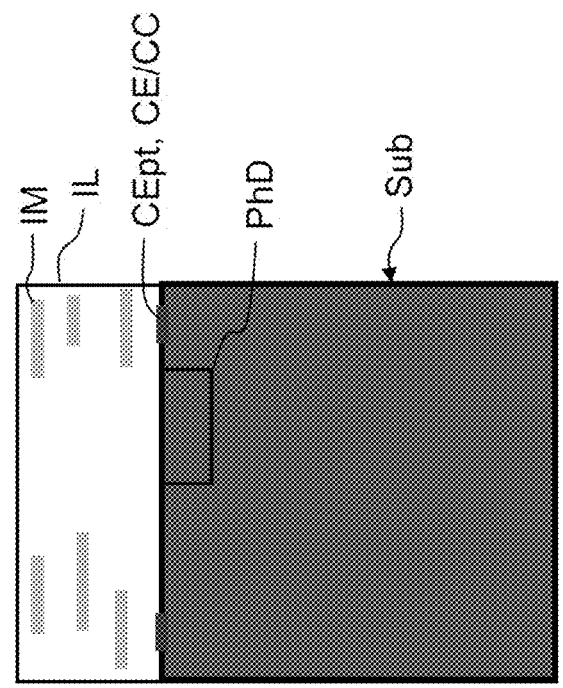

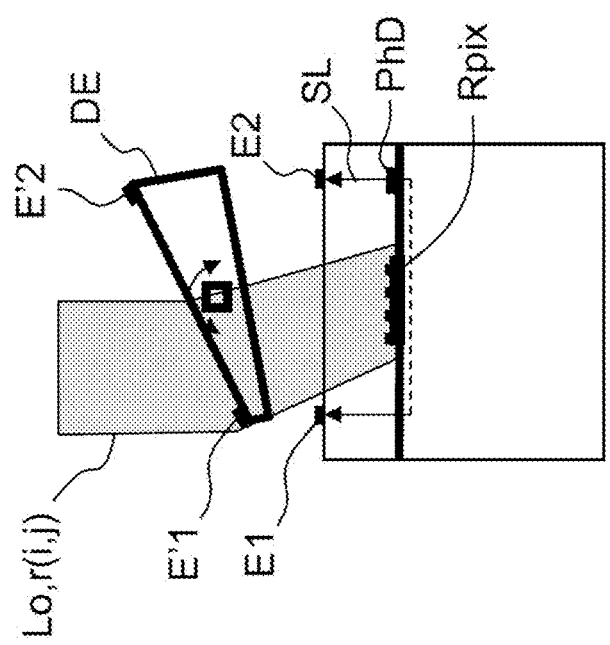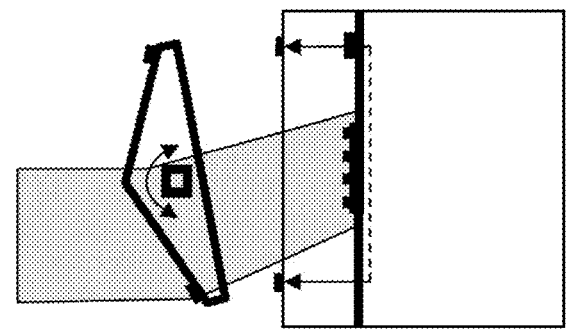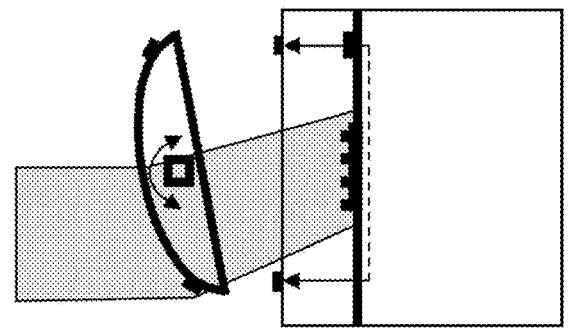
FIG.9

DETECTION DEVICE AND ASSOCIATED LIDAR SYSTEM

CROSS-REFERENCE TO RELATED APPLICATIONS

This application claims priority to foreign French patent application No. FR 2005186, filed on May 20, 2020, the disclosure of which is incorporated by reference in its entirety.

FIELD OF THE INVENTION

The present invention relates to the field of coherent lidar imaging, and more particularly to detectors used in such systems.

BACKGROUND

Imaging a scene using coherent lidar takes advantage of the coherent nature of the emission of a laser source in order to amplify the useful signal reflected by the scene using a signal from a reference path that is coherent with the useful signal.

The principle of coherent lidar is well known in the prior art. Coherent lidar comprises a coherent source, typically a laser, which emits a coherent light wave (IR, visible or near-UV range), an emission device that allows a volume of space to be illuminated, and a reception device, which collects a fraction of the light wave backscattered by a target T. The Doppler frequency shift of the backscattered wave is dependent on the radial velocity v of the target T: On reception, the received backscattered light wave, called signal wave S, of signal frequency fs, is mixed with a portion of the emitted wave that has not passed via the scene, called LO (local oscillator) wave, which has a local oscillator frequency fLO. The interference of these two waves is detected by a photodetector PD, and the electrical signal at the output of the detector has an oscillating term called beat signal Sb, in addition to the terms proportional to the received power and to the local oscillator power. This signal is digitized and information about the velocity of the target T is extracted therefrom.

In frequency-modulated coherent lidar, called FMCW (frequency-modulated continuous wave) lidar, schematically shown in FIG. 1, the optical frequency of the coherent source f is modulated, typically using a periodic linear ramp.

The two paths that interfere on the photodetector produce beats, the frequency of which is proportional to the delay between the two paths, and therefore to the distance.

More specifically, for a linear ramp, the frequency of the oscillations is:

$$f_R = \frac{2Bz}{cT}$$

where B is the optical frequency excursion or "chirp" over the duration T of the ramp, z is the distance and c is the speed of light.

The distance z may be deduced from the number N ($N \approx Tf_R$) of periods measured over the duration T:

$$z \approx \frac{Nc}{2B}.$$

The distance resolution is $$\delta z \approx \frac{c}{2B}.$$

It is also possible to measure $f_R$ by way of spectral analysis via Fourier transform of the beat signal.

The interference signal contains a DC component that is generally large and useless, which is removed by means of high-pass electronic filtering if the photoreceptor is a photodiode. In fibre-based setups, it is practical to use a 3 dB coupler that provides, on the basis of the two, object and reference, paths at input, two output signals in phase opposition that illuminate two photodiodes in series (balanced photodiodes). The detection circuit makes it possible to differentiate between the two photocurrents, and therefore to remove the DC (common mode) portion and to detect the AC (beat signal) portion. The AC portion is generally amplified externally by a transimpedance amplifier (TIA) before being processed by external electronics, for example an oscilloscope, in order to measure the frequency.

The FMCW lidar technique is an optical heterodyne measurement technique (that is to say it involves multiple optical frequencies). The technique is highly insensitive to stray ambient light such as for example sunlight.

To produce a complete image of the scene, the lidar sequentially scans the scene using a scanning device ("rolling shutter" image).

In practice, it is difficult to achieve acquisition of distance images at video frame rates (typically 50 Hz) for high-resolution images (for example VGA or XGA) because the time available for the distance measurement at each point is very short.

Instead of taking measurements point by point, the publication Aflatouni "Nanophotonic coherent imager" (2015, Optics Express vol. 23 no. 4, 5117), which also uses the FMCW technique, describes a device in which the entire scene is illuminated simultaneously by the laser beam that has been made divergent, and photodetection is performed in parallel for the entire scene. In this publication (see FIG. 2), the laser source Las is frequency-modulated by a modulator Mod, the object path illuminates the object to be analysed O and a lens L forms the image of the object on a coherent imager IC produced with integrated optics, more specifically on a matrix array of 4×4 optical coupling gratings Res. Each grating Res sends the coupled light into a lateral-coupling photodiode PD located outside the image, via a waveguide (see FIG. 3). The reference path is sent directly to the photodiodes via an optical fibre Fib and via a network of waveguides and Y-junctions. The conversion of the photocurrent into voltage is performed by a transimpedance amplifier TIA for each of the 16 photodiodes. Electronic filtering and signal processing are performed outside the chip in an electronic detection system SED.

This technique of detecting the entire scene in parallel is more suitable in principle for increasing the rate of acquisition of distance images.

However, in the architecture of the imager described in the Aflatouni publication, the configuration of the coherent imager is not readily scalable to a large number of pixels. It would be necessary to have 2N waveguides (N for the reference path and N for the object path) for N pixels, that is to say 2 million guides for a 1000×1000 pixel imager, thereby causing large problems in terms of routing and footprint. To artificially increase the effective number of pixels of their imager, the authors resort to the technique of multiple image captures with successive mechanical translations of the imager, which is not suitable for moving scenes.

In addition, the proposed architecture is sensitive to laser granularity, called speckle, generated by the backscattering of coherent light from the scene. The image of the object in the plane of the sensor is marred with speckle grains, the value of the lateral size of which is statistically:

$$\Phi g = 2 \cdot \lambda \cdot f \#$$

where $f \# = f/D$, where $f$ is the focal length of the imaging objective and $D$ the diameter of its exit pupil.

The beats due to the interference between the reference path and the object path that is affected by speckle are of the same frequency but phase-shifted randomly between adjacent speckle grains. If the pixels (that is to say the matrix arrays collecting the light) have a dimension apix larger than that of the speckle grains (Dg, as illustrated in FIG. 4 on the left, the amplitude of the resulting oscillations is attenuated and may become undetectable. Given the size of the diffraction gratings indicated (17×17 μm) and the wavelength of 1.55 μm, a large aperture number (f #>6) would be required to have speckle grains larger than the pixels. However, such a narrow-aperture optic is not favourable to the detection of relatively unreflective objects or those located substantial distances away, which will give very small backscattered photon fluxes; to compensate, this means using a laser source of higher power and therefore of higher electrical consumption, with the risk of exceeding the limits for eye safety. Thus, for a wide-aperture optic allowing the capture of a larger number of photons, the size of the speckle grains at the eye-safe wavelength of 1.55 μm is typically smaller than that of the light-collecting surface of a pixel, which presents detection problems.

SUMMARY OF THE INVENTION

One object of the present invention is to overcome the abovementioned drawbacks by proposing an integrated detector for coherent lidar that is compatible with a large number of pixels and with speckle grains of small size.

The present invention relates to a detection device for a coherent lidar imaging system comprising an integrated detector comprising a matrix array of pixels distributed over N columns and M rows and comprising:
  an optical guide, called reference guide, configured so as to receive a laser beam, called reference beam,
  N optical guides, called column guides, coupled to the reference guide, and designed to route part of the reference beam into the N columns of the detector,
  each column guide being coupled to M optical guides, called row guides, respectively associated with the M pixels of the M rows of the detector of said column, the M row guides being configured so as to route part of the reference beam into each pixel of the column, called pixel reference beam, the coupling between the reference guide and the N column guides, as well as the coupling between each column guide and the M associated row guides, being passive,
  each pixel of the integrated detector comprising:
    a guided photodiode coupled to an optical detection guide,
    a diffraction grating, called pixel grating, configured so as to couple a portion of a beam illuminating the pixel, called pixel coupled beam, into the guided photodiode,
    a coupler, called pixel coupler, configured so as to couple the pixel coupled beam and at least a fraction of the pixel reference beam into the detection guide, the guided photodiode thus being configured so as to receive said pixel coupled beam and at least said fraction of the pixel reference beam,
    an electronic circuit for readout and for preprocessing of a signal detected by the photodiode, the preprocessing comprising amplification and filtering.

According to one embodiment, the detection device furthermore comprises at least one electronic processing circuit configured so as to calculate, for each pixel, a frequency of a beat between the pixel reference beam and the pixel coupled beam. According to one option, each pixel comprises its own electronic processing circuit designed to calculate the beat frequency associated with the pixel. According to another option, each column is connected to an electronic processing circuit configured so as to calculate the beat frequency associated with each pixel of the column.

According to one embodiment, the coupling between the reference guide and the N column guides, as well as the coupling between each column guide and the M associated row guides, is evanescent.

According to one variant, the detection device according to the invention furthermore comprises:
  a matrix array of transmissive deflecting elements, a deflecting element being associated with a pixel or a group of pixels and configured so as to be able to be oriented individually by an electrical signal so as to deflect the one or more beams illuminating the one or more pixels,
  each pixel or pixel group furthermore comprising a control loop associated with the deflecting element and configured so as to actuate the deflecting element so as to maximize a signal-to-noise ratio (SNR) of the detected signal generated by the guided photodiode.

The deflecting element is preferably chosen from a prism, a polyhedron, a spherical dome, and a diffractive optical element.

According to one embodiment, a distance between the matrix array of deflecting elements and the integrated detector is between one and ten times a lateral dimension of the deflecting element.

According to another variant, the detection device furthermore comprises a matrix array of microlenses associated with the pixel matrix array, a microlens being configured so as to focus the beam illuminating the associated pixel on the pixel grating.

According to a first variant of the detection device according to the invention:
  the pixel grating and the pixel coupler are two different components,
  the row guide is connected to the pixel coupler,
  each pixel furthermore comprising a pixel waveguide coupled upstream to the pixel grating and downstream to the pixel coupler and configured so as to route the pixel coupled beam to the pixel coupler.

According to one embodiment, the pixel coupler is a Y-junction.

According to a second variant of the detection device according to the invention:
  the pixel grating is also the pixel coupler,
  the pixel grating is coupled upstream to the row guide and downstream to the detection guide, so as to route said fraction of the pixel reference beam into the detection guide, the pixel grating furthermore being configured so as to couple another fraction of the pixel reference beam, called pixel object beam, into free space, in at least one direction opposite that of the beam illuminating the pixel.

According to another aspect, the invention relates to a coherent lidar imaging system.

According to a first variant, the lidar comprises:
a detection device according to the first variant,
a laser source configured so as to emit laser radiation having a temporally modulated optical frequency,
a splitter device designed to spatially split the laser radiation into a beam, called reference beam, and into a beam, called object beam, that is directed towards a scene to be observed,
a coupling device configured so as to couple the reference beam into the integrated detector,
an optical imaging system producing an image of the scene by focusing a beam reflected by the scene on the detection device,
a processing unit connected to the integrated detector and to the laser source comprising, where applicable, an electronic processing circuit when it is not located on the integrated detector, the electronic processing circuit being configured so as to determine a beat frequency between the pixel reference beam and the pixel coupled beam, calculated for each pixel, the processing unit being configured so as to determine a distance of points of the scene that are imaged on the pixels of the integrated detector, based on the beat frequency.

According to one embodiment, the splitter device, the coupling device and the integrated detector are produced on the same substrate, the splitter device comprising an integrated optical circuit subdividing into a plurality of waveguides each comprising at least one diffraction grating, called object grating, the object gratings being configured so as to decouple part of the laser beam from the plane of the integrated optical circuit so as to form the object beam, and into at least one waveguide without a grating guiding the reference beam to the detector, and forming the coupling device.

According to a second variant, the lidar comprises:
a detection device according to the second variant,
a laser source configured so as to emit laser radiation, having a temporally modulated optical frequency, and coupled to the integrated detector, the laser radiation coupled into the integrated detector forming the reference beam,
an optical imaging system producing an image of a scene to be observed on the integrated detector,
a superposition of the pixel object beams from the pixel gratings and passing through the optical imaging system forming an object beam illuminating the scene, and a beam reflected by the scene and focused on the integrated detector forming an illumination beam for each pixel,
the imaging system furthermore comprising a processing unit connected to the integrated detector and to the laser source comprising, where applicable, an electronic processing circuit when it is not located on the detector, the electronic processing circuit being configured so as to determine a frequency of a beat between the pixel reference beam and the pixel coupled beam, calculated for each pixel, the processing unit being configured so as to determine a distance of points of the scene that are imaged on the pixels of the detector, based on the beat frequency.

The following description gives a number of exemplary embodiments of the device of the invention: these examples do not limit the scope of the invention. These exemplary embodiments not only have features that are essential to the invention but also additional features that are specific to the embodiments in question.

BRIEF DESCRIPTION OF THE DRAWINGS

The invention will be better understood and other features, aims and advantages thereof will become apparent from the detailed description which follows and with reference to the appended drawings, which are given by way of non-limiting example and in which:

FIG. 6A illustrates one preferred embodiment of a "back side" (BSI) detector according to the invention.

FIG. 6B illustrates one embodiment of the "front side" (FSI) detector.

FIG. 9 illustrates one embodiment of the detection device according to the invention comprising a matrix array of deflecting elements.

DETAILED DESCRIPTION

Figure 5:
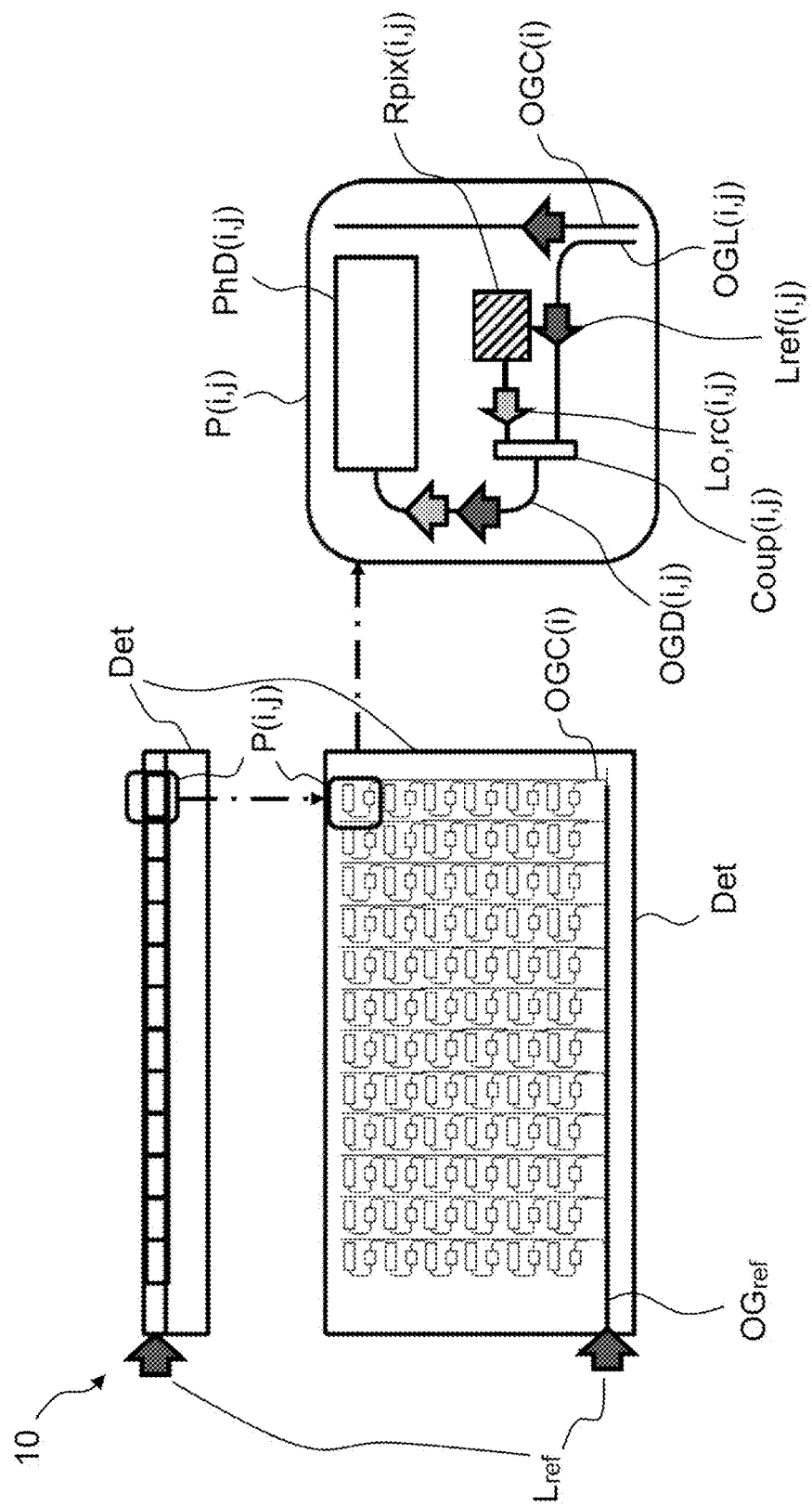
FIG. 5 illustrates the detection device for a coherent lidar imaging system according to the invention.

The detection device 10 for a coherent lidar imaging system according to the invention is shown schematically in FIG. 5. It comprises an integrated detector Det comprising a matrix array of pixels P(i,j) distributed over N columns (index i) and M rows (index j).

The detector Det comprises an optical guide, called reference guide OGref, configured so as to receive a laser beam, called reference beam Lref. It also comprises N optical guides OGC(i), called column guides, coupled to the reference guide OGref, and designed to route part of the reference beam into the N columns of the detector. Each column guide i is coupled to M optical guides OGL(i,j), called row guides, respectively associated with the M pixels of the M rows (indexed j) of the detector of the column i. The M row guides are configured so as to route part of the reference beam into each pixel of the column. The part of the reference beam arriving in each pixel is called pixel reference beam Lref(i,j). The coupling between the reference guide and the N column guides, as well as the coupling between each column guide and the M associated row guides, is passive. According to one preferred embodiment, the coupling between the reference guide OGref and the N column guides, as well as the coupling between each column guide and the M associated row guides, is evanescent. According to another embodiment, the coupling is a Y-junction. For the distribution in the N columns, the coupling coefficient (coupling force) is preferably provided so as to increase between the first and the last column so as to ensure similar luminous intensity in each column. This is achieved for example by gradually increasing the length of the coupling region in the directional coupler. The same principle may be repeated on each of the columns so as to supply the M guides associated with the M pixels in a row located along this column.

When the detector is integrated with a lidar, the scene to be observed is imaged on the detector with an imaging system designed to provide a certain image quality on the detector (minimization of geometric aberrations with respect to the features of the detector, such as the number and the size of the pixels).

Each pixel P(i,j) of the integrated detector comprises a guided photodiode PhD(i,j) coupled to an optical detection guide OGD(i,j).

A pixel also comprises a diffraction grating, called pixel grating Rpix(i,j), configured so as to couple a portion Lo,rc(i,j) of the beam illuminating the pixel Lo,r(i,j) (from the scene via the optical imaging system), called pixel coupled beam, into the guided photodiode PhD(i,j). The pixel grating is for example a grating etched on the surface of a waveguide.

A pixel also comprises a coupler, called pixel coupler Coup(i,j), configured so as to couple the pixel coupled beam Lo,rc(i,j) and at least a fraction Lref'(i,j) of the pixel reference beam Lref(i,j) into the detection guide OGD(i,j).

With this configuration, the guided photodiode PhD(i,j) is thus configured so as to receive the pixel coupled beam Lo,rc(i,j) and at least the fraction Lref'(i,j) of the pixel reference beam Lref(i,j).

Light is coupled into the photodiode using a conventional method, through butt coupling or through evanescent coupling. The two beams received by the photodiode interfere, as explained above.

Finally, a pixel comprises an electronic circuit CEpt for readout and for preprocessing of a signal detected by the photodiode, the preprocessing comprising amplification and filtering.

A detector pixel thus consists of integrated optical components (guides, grating, coupler) and integrated electronic components (photodiode). The matrix array-based and integrated nature of the detector Det according to the invention makes it compatible with a large number of pixels, making it possible to produce a high-resolution lidar image. Specifically, the fact that each pixel comprises its photodiode makes it possible to considerably reduce problems in terms of routing beams and in terms of bulk caused by multiple waveguides, in contrast to the Aflatouni architecture. The heterodyne mixing takes place here in each pixel.

The photodiode is produced in a semiconductor substrate, such as silicon, germanium, an III-V semiconductor such as AsGa, InGaAs, etc.

The pixel grating is typically a periodic structure etched into a waveguide.

According to one preferred variant, the detector Det according to the invention also comprises at least one electronic processing circuit configured so as to calculate, for each pixel, the beat frequency F(i,j) between the pixel reference beam and the pixel coupled beam. The detector in this case incorporates the processing electronics, thereby reducing the data flows from the matrix array detector to an external processor, and making it possible to leave the detector only for distance data.

According to one preferred embodiment of this variant, each pixel comprises its own electronic processing circuit CE(i,j) designed to calculate the beat frequency associated with the pixel. All processing is thus performed locally on the pixel, which processing is called "global shutter" processing, which means a high level of integration at each pixel and a pixel of sufficient size.

According to another embodiment, the processing is performed in columns, called "rolling shutter" processing. To this end, each column is connected to an electronic processing circuit CC(i) configured so as to calculate the beat frequency associated with each pixel of the column. Readout is performed row by row for all of the pixels of a row (this corresponding to one pixel per column), running through all of the rows in succession. Such an architecture limits integration constraints in the pixel, allowing its size to be decreased, while at the same time performing the processing locally on the periphery of the detector.

In this variant, only the image postprocessing is performed in an external unit.

According to another variant, the beat frequency for each pixel is calculated in an external unit.

The pixel grating preferably has a small surface area, for example a dimension on one side of a few μm, less than 10 μm, for a rectangular and square shape. This allows the grating to have a relatively high angular acceptance, compatible with the angular range of light from the imaging system, which typically has a relatively wide aperture in order to recover a maximum amount of light.

A small grating also makes it possible to be closer to a situation in which the speckle grain of light incident on the pixel is of the same order of magnitude as the grating, making it possible to collect light from a single grain in a pixel. Typically, for a wavelength of 1.55 μm and a numerical aperture of the optical imaging system of 3, the speckle grain statistically has a dimension of approximately 10 μm.

The matrix array of integrated photodiodes PhD is produced in and/or on a semiconductor substrate Sub on which there are arranged interconnect layers IL, which are dielectric insulating layers in which tracks and metal vias (interconnects IM) are formed.

FIGS. 6A and 6B illustrate two exemplary structures of a detector Det according to the invention. The detectors in FIGS. 6A and 6B comprise an optional matrix array of microlenses ML. A microlens ML is associated with a pixel of the detector and focuses the beam that illuminates the associated pixel on the grating Rpix: all of the incident light on the pixel is redirected to the grating. These microlenses are conventionally produced through the flow of a layer of resin.

FIG. 6A illustrates one example of a structure of the detector Det, based on the structure of what are called "front side illumination" (FSI) imagers.

The optical components (waveguides, gratings, guided photodiodes) are typically formed using known microelectronics techniques for producing integrated circuits for photonics on silicon. In this example, the waveguides and gratings are produced by etching the thin layer of silicon SOI (called silicon on insulator) located on the layer of buried oxide (BOX) deposited on the substrate SUB. Such a substrate comprising a BOX layer and an SOI layer is called an SOI substrate. The components are planarized by depositing a filler oxide 6 and chemical-mechanical polishing.

The guided photodiodes use additional known steps, such as epitaxial growth of the absorbent material (example: germanium) on the silicon SOI, implantation of p and n regions, dielectric encapsulation and formation of electrical contacts.

In this FSI configuration, the illumination takes place via the front face, that is to say the face of the substrate Sub where the metal interconnects are located. All of the electronic circuits (consisting of transistors, filters, etc.) required for the operation of the detector may be formed on the surface of the semiconductor (in and/or on the layer of silicon SOI): driver and readout circuit for the photodiodes CEpt, signal processing circuit for measuring the frequency of the beats CE/CC.

FIG. 6B illustrates one example of a structure of the detector Det, based on the structure of what are called "back side" (BSI) imagers.

Such a BSI detector is produced by bonding the SOI substrate/layer IL assembly to a carrier substrate Sub'/layer IL' assembly, which may include CMOS circuits (the imager is then said to be "3D stacked"), such as processing circuits CE/CC (located in the pixels or on the periphery). The SOI substrate is then thinned, typically until the substrate Sub (and optionally the BOX) disappears. An oxide layer 5 may then be added at the end of the process so as to perform the role of a "pedestal", in order to ensure the correct focal distance between the microlens and the grating.

In this configuration, which is known in the field of microelectronics, light is incident on the side outside the substrate Sub (which is thinned) opposite the metal interconnects.

3D stacking allows more freedom in the electronics design by shifting the signal processing circuit to the carrier substrate. A larger part of the surface area of the pixel is available for the readout circuit.

In contrast to conventional FSI and BSI architectures that use unguided photodiodes, in the two architectures according to the invention above, light propagates essentially in the plane of the substrate.

Figure 7A:
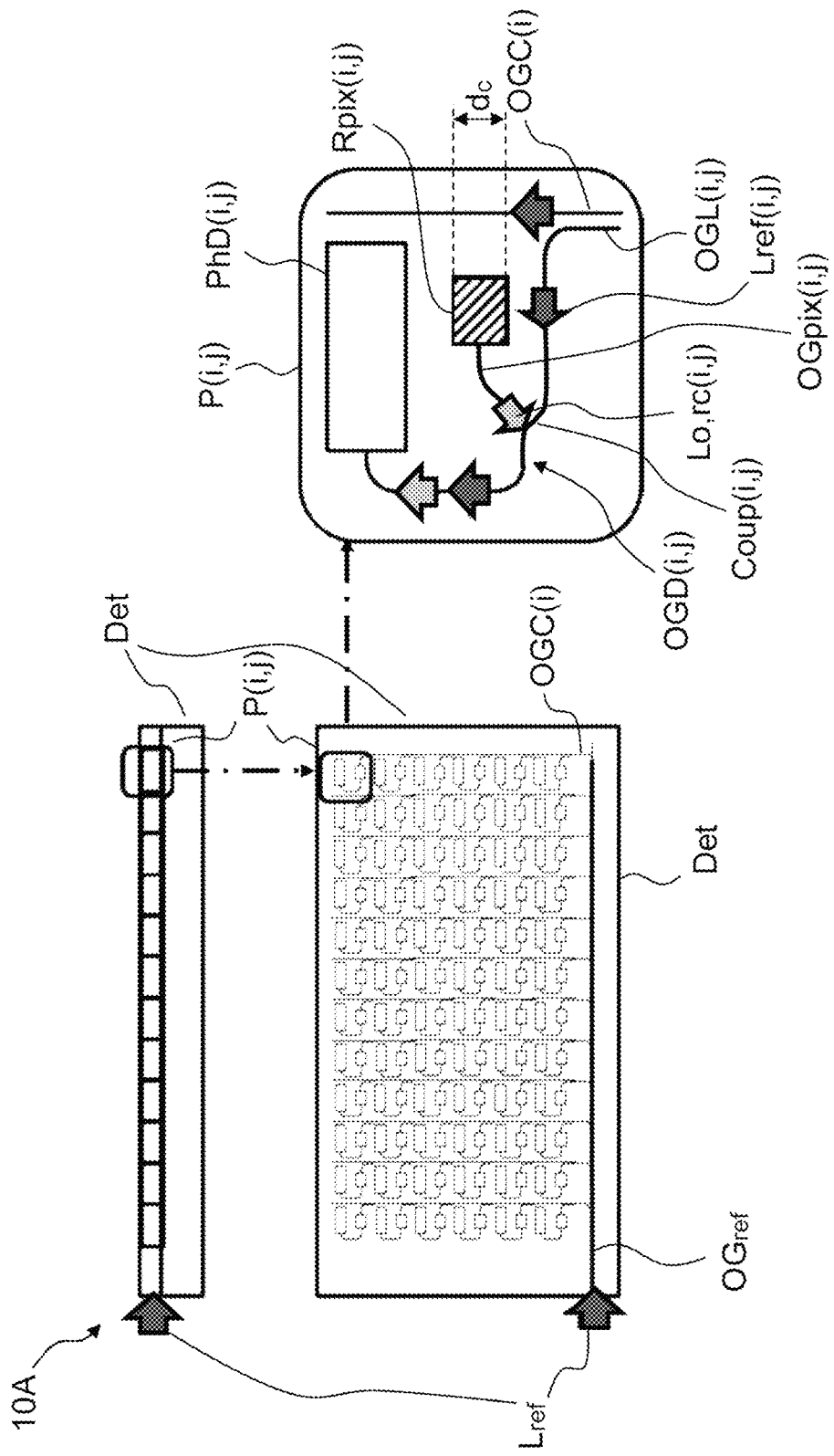
FIG. 7A illustrates a first variant of the detection device according to the invention in which the pixel grating and the pixel coupler are two different components.
Figure 7B:
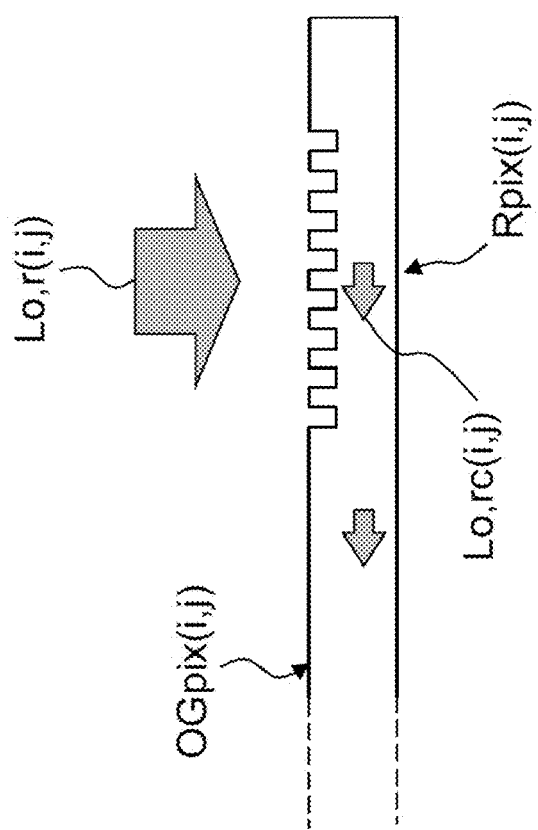
FIG. 7B illustrates a sectional view of the pixel grating of the first variant.

The pixel of the detector Det according to the invention may have two different architectures. A first variant of the detection device 10A is illustrated in FIG. 7A. In this first variant, the pixel grating Rpix and the pixel coupler Coup are two different components, and the row guide OGL is connected to the pixel coupler Coup. A pixel waveguide OGpix is coupled upstream to the pixel grating Rpix and downstream to the pixel coupler Coup and routes the pixel coupled beam Lor,c to the pixel coupler Coup. In this variant, the whole pixel reference beam Lref(i,j) is directed to the coupler Coup. FIG. 7B illustrates a sectional view of the pixel grating Rpix, which is typically etched into the waveguide OGpix. The pixel grating directs part Lo,rc(i,j) of the beam illuminating the pixel Lo,r(i,j) into the waveguide OGpix(i,j). The pixel coupler Coup is preferably a Y-junction. The object path (Lo,rc(i,j)) and reference path (Lref(i,j)), each carried by their waveguide, respectively OGpix(i,j) and OGL(i,j), are thus then combined via a Y-junction (Coup(i,j)) and sent to the guided photodiode PhD(i,j) via OGD(i,j).

Figure 8A:
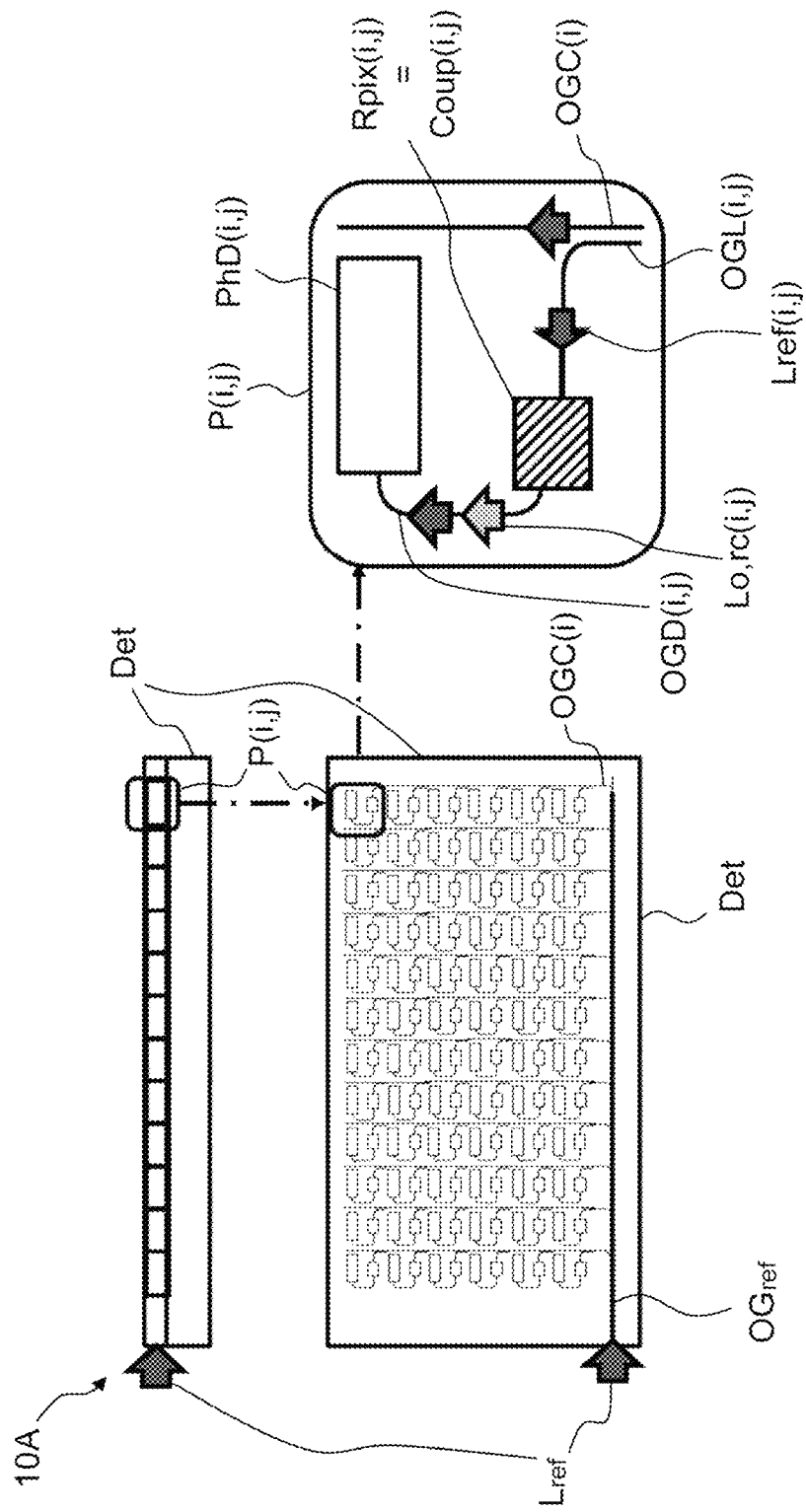
FIG. 8A illustrates a second variant of the detection device according to the invention in which the pixel grating also forms the pixel coupler.

A second variant of the detection device 10B is illustrated in FIG. 8A. In this first variant, the pixel grating Rpix is also the pixel coupler Coup, that is to say it performs both functions, coupling illumination light Lo,r into the pixel and coupling with the reference beam. The pixel grating Rpix (i,j) is coupled upstream to the row guide OGL(i,j) and downstream to the detection guide OGD(i,j), so as to route the fraction Lref'(i,j) of the pixel reference beam Lref(i,j) into the detection guide. The pixel grating is furthermore also configured so as to couple another fraction of the pixel reference beam, called pixel object beam Lo(i,j), into free space, in at least one direction opposite that of the beam illuminating the pixel (from the scene).

Figure 8B:
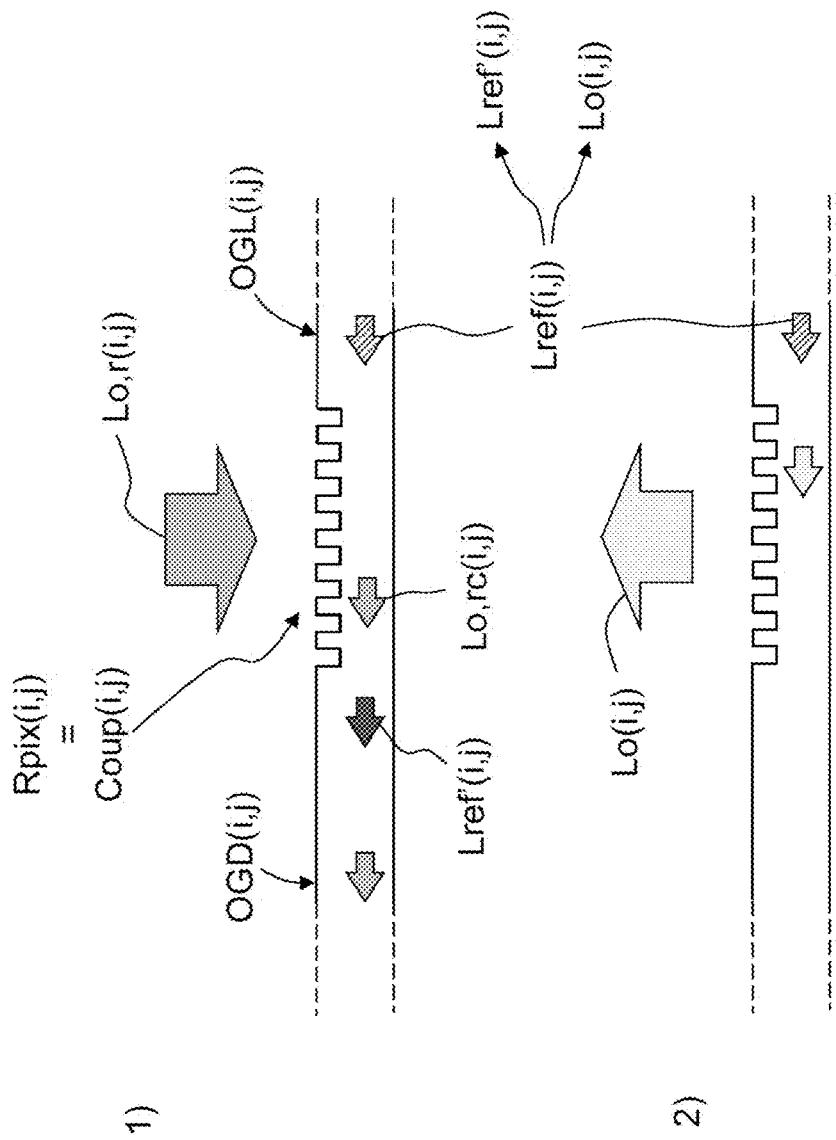
FIG. 8B illustrates a sectional view of the pixel grating of the second variant.

This architecture, via the pixel grating Rpix, allows dual use of the pixel reference beam Lref(i,j) when integrating the detector into a lidar, as illustrated in FIG. 8B.

Figure 1:
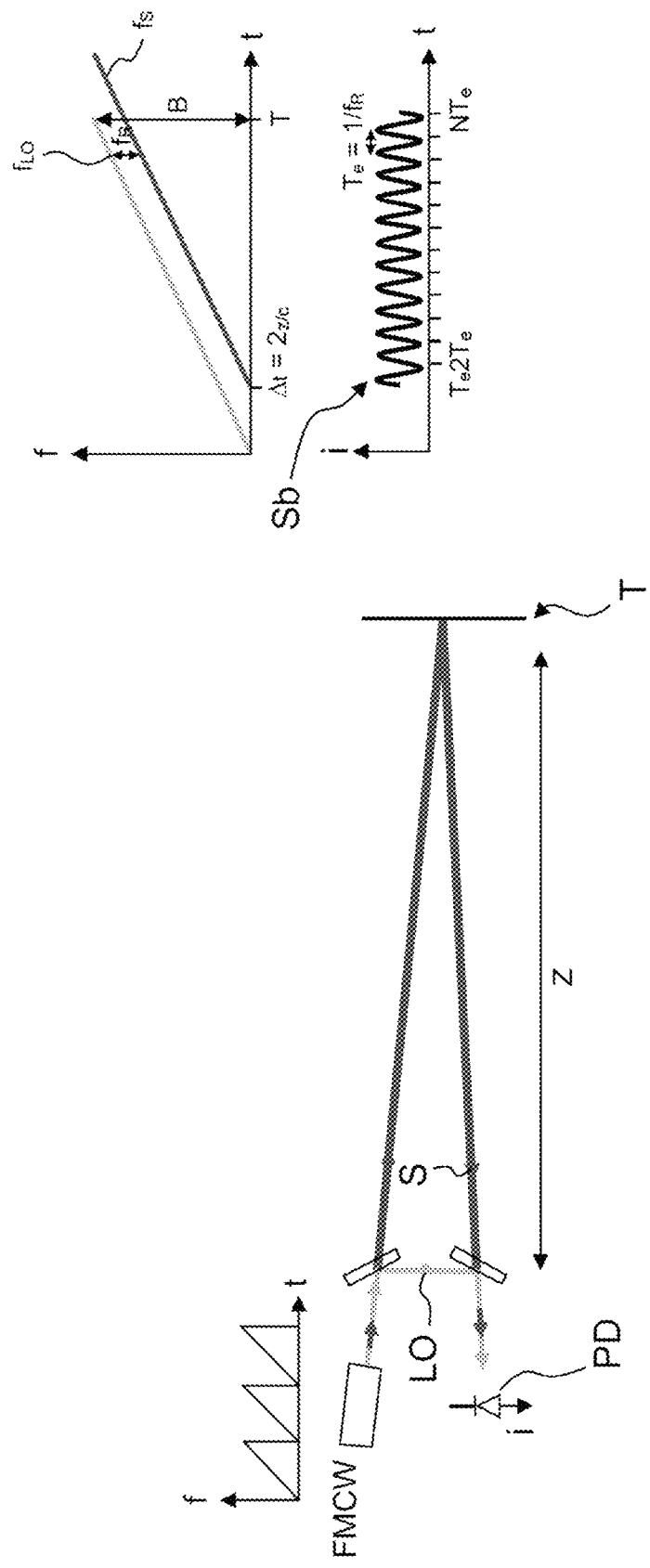
FIG. 1, mentioned above, illustrates the principle of FMCW frequency-modulated lidar.

FIG. 8B 1) illustrates a first function of coupling the wave Lo,r(i,j) into the waveguide OGD(i,j) and of superposing the coupled wave Lo,rc(i,j) with the fraction Lref'(i,j) of the pixel reference beam Lref(i,j).

Figure 2:
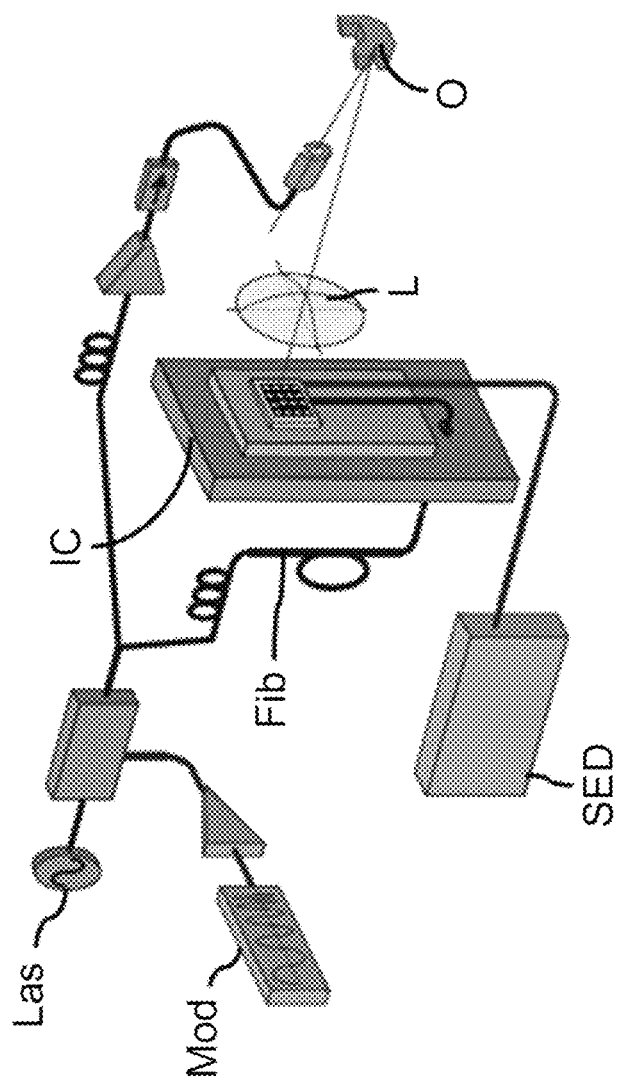
FIG. 2, mentioned above, illustrates a partially integrated FMCW architecture according to the prior art.
Figure 3:
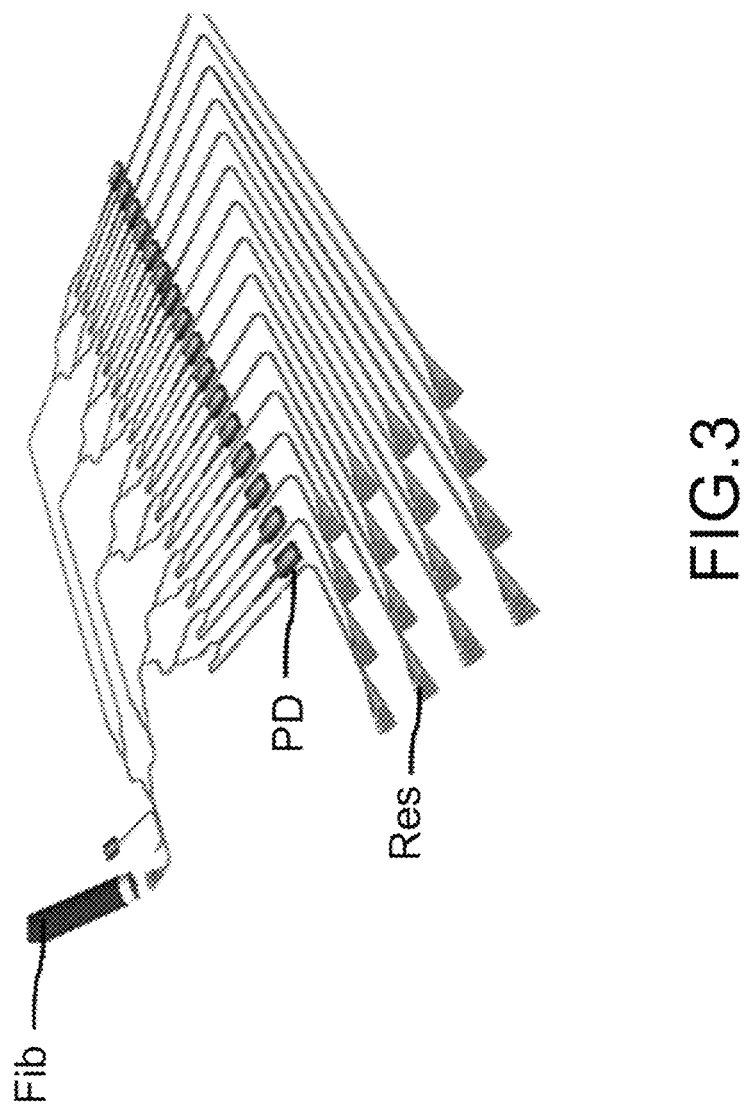
FIG. 3, mentioned above, illustrates the coherent recombination performed by the system described in FIG. 2.
Figure 4:
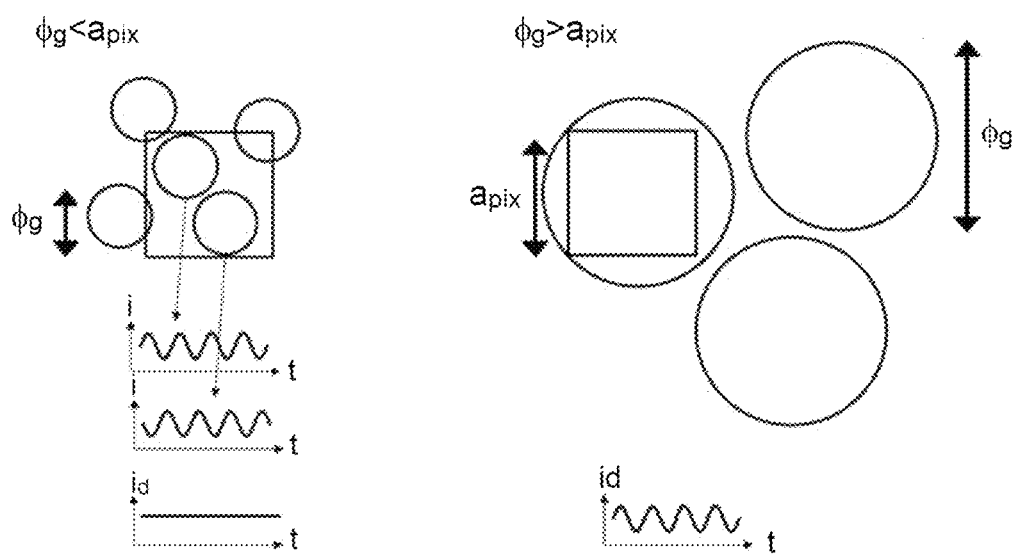
FIG. 4, mentioned above, illustrates two cases of speckle geometry with respect to a pixel, the figure on the left corresponding to speckle grains smaller than the size of the pixel and the figure on the right corresponding to speckle grains larger than the dimension of the pixel.

FIG. 8B 2) illustrates a second illumination function: another fraction of the pixel reference beam Lref(i,j) is not sent to the photodiode, but sent to free space by the pixel grating so as to form the pixel object beam Lo(i,j). The wave resulting from the superposition of all of the pixel object beams passes through the imaging system and illuminates the scene to be observed.

The architecture of the lidar comprising the detector Det according to this second variant 10B is simplified, the detector being used both to illuminate the scene and to detect light backscattered thereby, based on a single coherent beam generated by the laser and injected into the detector.

In order to be able to perform this dual function, the diffraction grating has to have a high angular acceptance, compatible both with the angular range of the light from the imaging optic and with the angle of incidence of the reference beam.

By way of example, the angular acceptance of the grating is of the order of $\lambda/dc$, where dc is the width of the grating. To correspond to the angular range $\delta\Theta \sim 2$ a sin $(\frac{1}{2}N) \sim 1/N$ of the light from the imaging optic (N=aperture number), the size of the grating should be such that: $dc < N\lambda$, that is to say: $dc < 5$ μm for $N=3$ and $\lambda = 1.55$ μm.

According to one compatible embodiment of the two variants described above, the detection device 10 according to the invention also comprises a matrix array of microlenses for focusing light in the pixel: a microlens is associated with a pixel and is configured so as to focus the beam illuminating the associated pixel (or at least part of this beam) on the pixel grating. These matrix arrays are produced using known microelectronics methods, such as flow of a resin or greyscale photolithography.

According to another embodiment, the detection device 10 according to the invention comprises a matrix array of transmissive deflecting elements DE that are transparent to the usage wavelength. A deflecting element DE is associated with a pixel or a group of pixels and configured so as to be able to be oriented individually by an electrical signal so as to deflect the one or more beams illuminating the one or more pixels. FIG. 9 illustrates this embodiment for the non-limiting case where there is one element DE per pixel. The function of these elements is that of improving detection of light by the gratings Rpix. To this end, each pixel or pixel group furthermore comprises a control loop SL associated with the deflecting element DE and configured so as to actuate the deflecting element so as to maximize a signal-to-noise ratio SNR of the detected signal generated by the guided photodiode.

The element DE is of non-constant thickness, and is able to be oriented about one axis or about two axes, these one or more axes of rotation being perpendicular to the plane of the detector. It is preferably chosen from among a prism (rotation about one axis), a polyhedron, a spherical dome (see FIG. 9 illustrating these three shapes), or a diffractive optical element.

In a lidar, the beam from the scene and incident on the matrix array of deflecting elements is a speckle field that is said to be subjective because it is the speckle formed in the image of a scene by an optical imaging system. The lateral characteristic size of the speckle grains is $2 \cdot \lambda \cdot f\#$, of the same order of magnitude as the Airy disc or diffraction disc of the optical system, ignoring geometric aberrations of the optical system.

Figure 10:
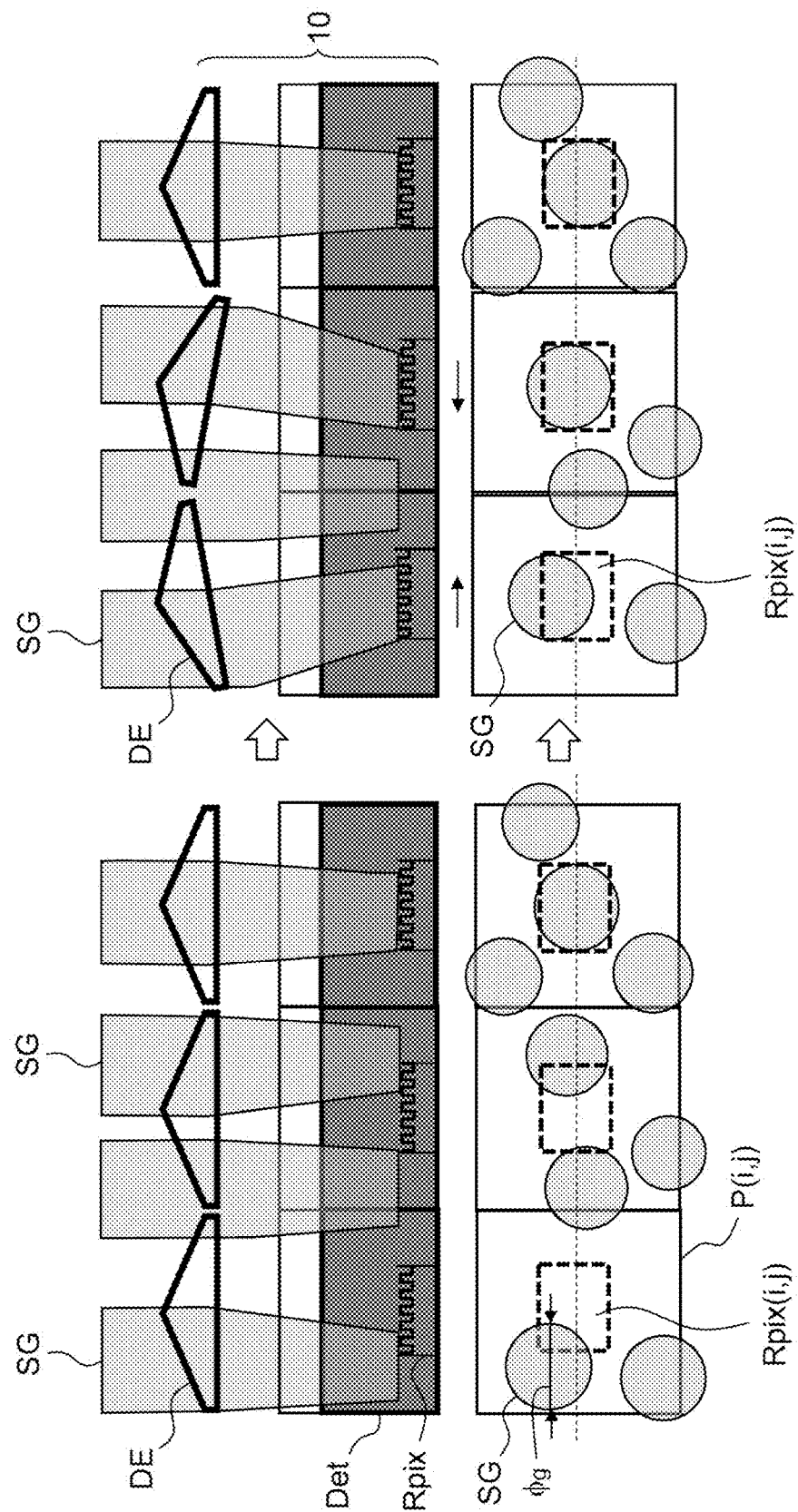
FIG. 10 illustrates the way in which the matrix array of deflecting elements modifies the topography of the speckle field of the illumination beam in the plane of the pixel.

The matrix array of deflecting elements DE globally modifies the topography of the speckle field of the illumination beam in the plane of the pixel, and notably the distribution of the speckle grains SG, as illustrated in FIG. 10. (Dg denotes its average diameter of the cross section of a speckle grain in the plane of the pixel, which remains of the same order of magnitude as upstream of the matrix array of deflecting elements, giving (see above):

$$\Phi g = 2 \cdot \lambda \cdot f\#$$

When the orientation of a deflecting element is modified, this also modifies the distribution of the speckle grains in the plane of the pixel and therefore the arrangement of the grains with respect to the grating Rpix, allowing the incident light to be coupled into a waveguide. It is sought to centre a speckle grain on the grating. The actuation of the deflecting elements aims to increase the heterodyne signal detected by the photodiode PhD. This modifying of the speckle field is generally complex and difficult to describe analytically because the deflecting elements operate in diffractive mode, that is to say the effects of diffraction related to their relatively small individual lateral size and to their matrix array organization are non-negligible.

In practice, the local speckle field with respect to the surface of the pixel is modified blind. Neither the initial distribution nor the final distribution of the speckle at the surface of the pixel is known. This starts with the initial AC signal delivered by the photodetector, corresponding to the beat signal of the lidar (variable component of the detected signal). The orientation of the deflecting element is modified in one direction: if the AC signal increases, this is continued, and if it decreases, it is oriented in the other direction. An optimum of the AC signal is sought by following an optimization algorithm in a problem with one or two dimensions depending on whether the number of axes of rotation of the rotation element is one or two. It is possible to arrive at a local, or absolute, maximum, but in any case at one higher than the initial value of the AC signal. If the AC signal is initially zero or near-zero, the available space is scanned until a signal is obtained. The AC oscillation signal detected by each photodiode is therefore used as a feedback signal for the actuation of the deflecting element: it is this AC signal that is maximized in actuating the deflecting element. Maximizing the AC signal maximizes the detected signal-to-noise ratio, that is to say the heterodyne efficiency is improved by limiting the impact of the speckle.

When a deflecting element is associated with a group of n×m pixels, the feedback is produced on the basis of the n×m signals detected by the photodiodes of the pixels of the group, and the optimization algorithm has n×m inputs. The deflection of the element DE then corresponds to a trade-off between the various pixels of the group.

The use of deflecting elements is particularly appropriate when the dimension of the speckle grains is smaller than that of the pixel, up to a dimension of the order of magnitude of that of the grating Rpix(dc), or even slightly smaller. Since the grating Rpix is small (dc from a few microns to around ten microns), this situation corresponds to that of relatively wide-aperture imaging optic, which is the preferred option for sensing a maximum amount of light from the scene.

By way of example, for $\lambda=1.55$ μm and $f\#=3$, $\Phi g \sim 10$ μm.

The limit is that there must not be multiple grains on the surface of the grating.

Figure 11:
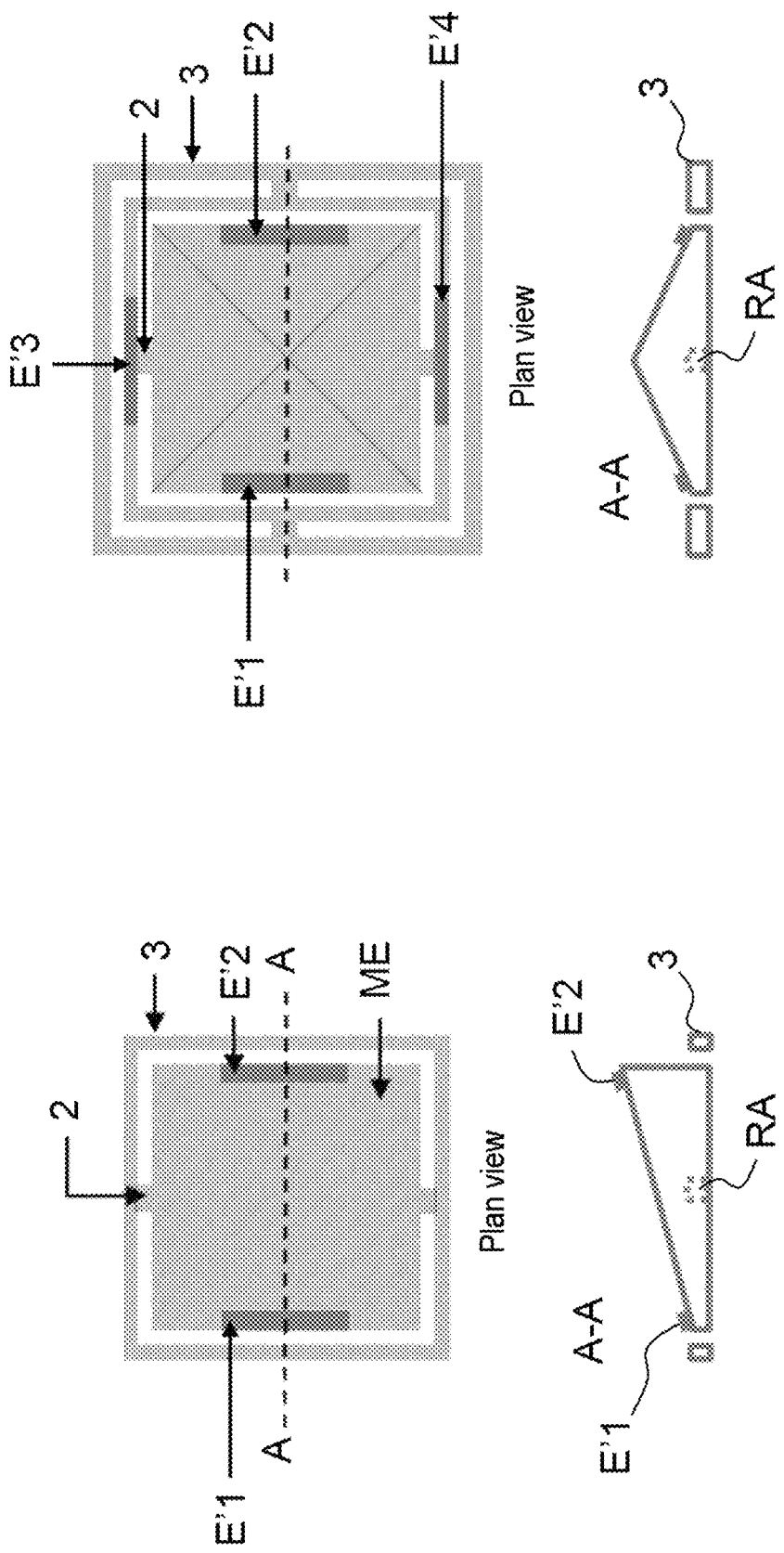
FIG. 11A illustrates a deflecting element having a prism shape.
FIG. 11B illustrates a deflecting element having a roof-shaped polyhedron shape.

Seen from above, the deflecting element takes the shape of a plate of non-constant thickness that is able to pivot about at least one horizontal axis RA, and is held on the sides by two lateral arms 2 in a direction perpendicular to this axis of rotation, as illustrated in FIG. 11A for a prism (one axis of rotation) and in FIG. 11B for a roof-shaped polyhedron. The arms are connected to a fixed and rigid frame 3 on the periphery of the pixel. In the case of two axes of rotation, there are two frames and one is able to pivot with respect to the other (FIG. 11B).

The actuation is preferably electrostatic and uses a set of electrodes. Each deflecting element comprises at least two electrodes E'1, E'2 respectively facing at least two electrodes E1, E2 arranged on the surface of the detector, the deflecting element being actuated electrostatically by applying electrical voltages to the electrodes, in the direction of at least one axis of rotation parallel to the plane of the detector. The electrodes E1 and E2 (and, where applicable, two additional electrodes) are located at the surface of the pixel facing the electrodes of the deflecting element. The electrodes E1, E'2 (and, where applicable, E'3, E'4, see FIG. 11B) of the deflecting element are located either on its upper surface, or inside.

The electrodes on the pixel may be at the same potential, and those of the deflecting element at different potentials, or vice versa. Applying different voltages makes it possible to produce vertically directed electrostatic fields and to attract the various electrodes to one another.

The electronic components allowing feedback control of the voltage of the electrodes may be located in the CMOS at the same level as the readout electronics for the pixel, or for one pixel of the group (when there is one deflecting element for a group of pixels).

Preferably, the distance between the matrix array of deflecting elements and the integrated detector is between one and ten times the lateral dimension of the deflecting element.

Figure 12:
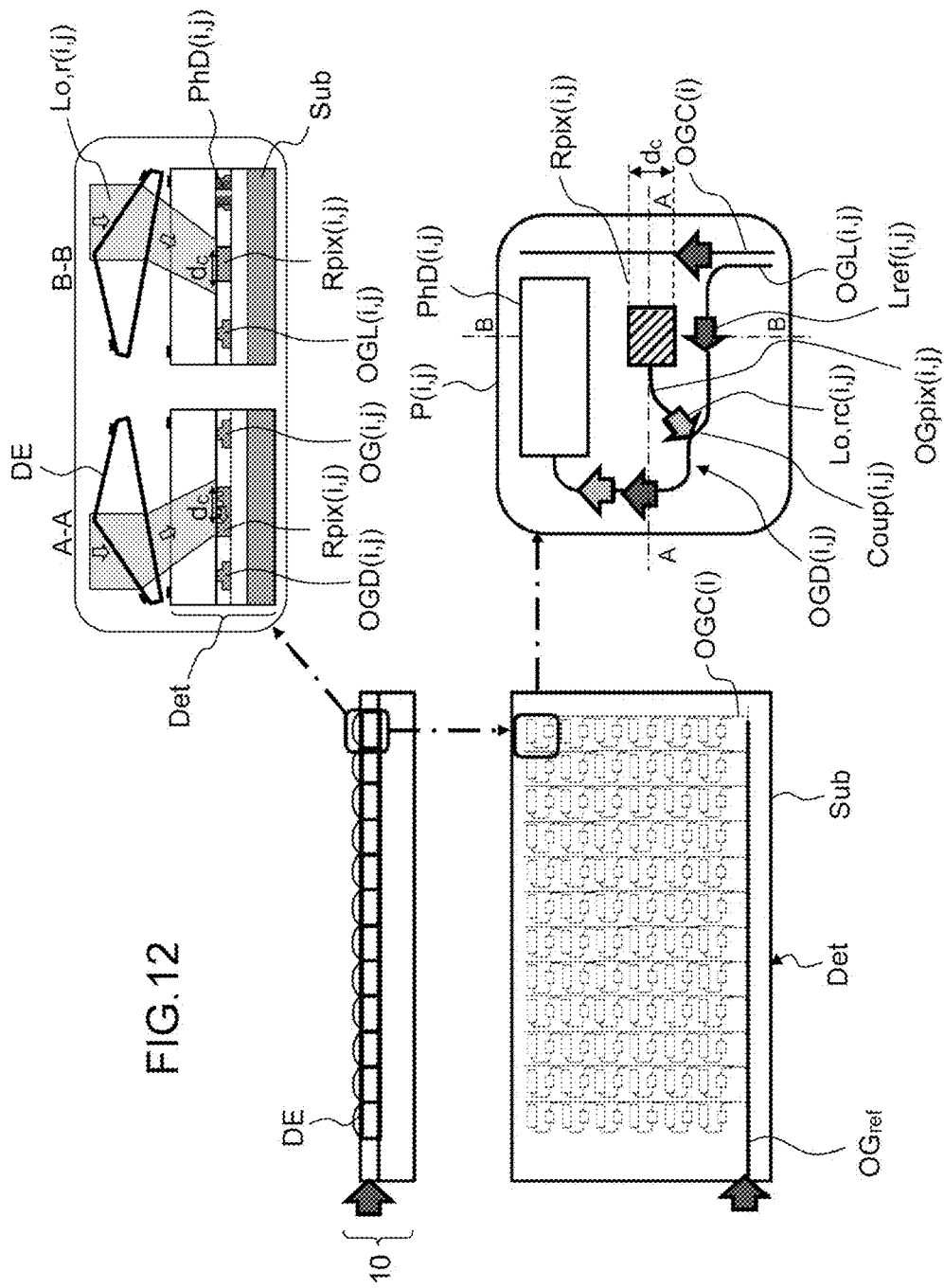
FIG. 12 illustrates the detection device according to the first variant incorporating the deflecting elements.
Figure 13:
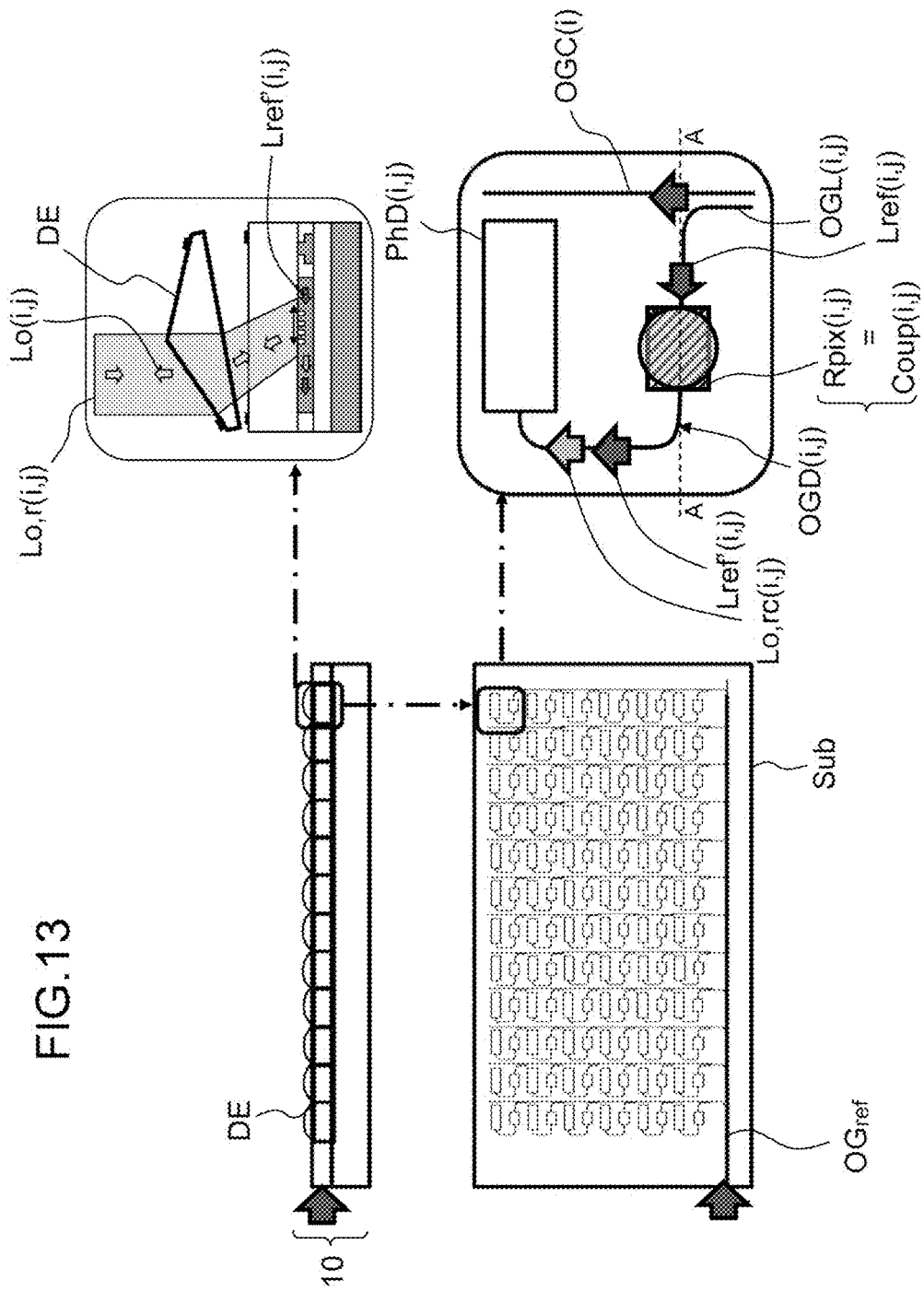
FIG. 13 illustrates the detection device according to the second variant incorporating the deflecting elements.

FIG. 12 illustrates the detection device 10 according to the first variant, incorporating these deflecting elements DE, and FIG. 13 illustrates the detection device 10 according to the second variant. In the first variant, only the beams illuminating the pixels Lo,r(i,j) (from the scene) pass through the elements DE, whereas, in the second variant, the fraction Lo(i,j) from the detector and directed towards the scene also passes through the elements DE in the opposite direction.

According to another aspect, the invention relates to a coherent lidar imaging system incorporating a detection device according to the invention.

Figure 14:
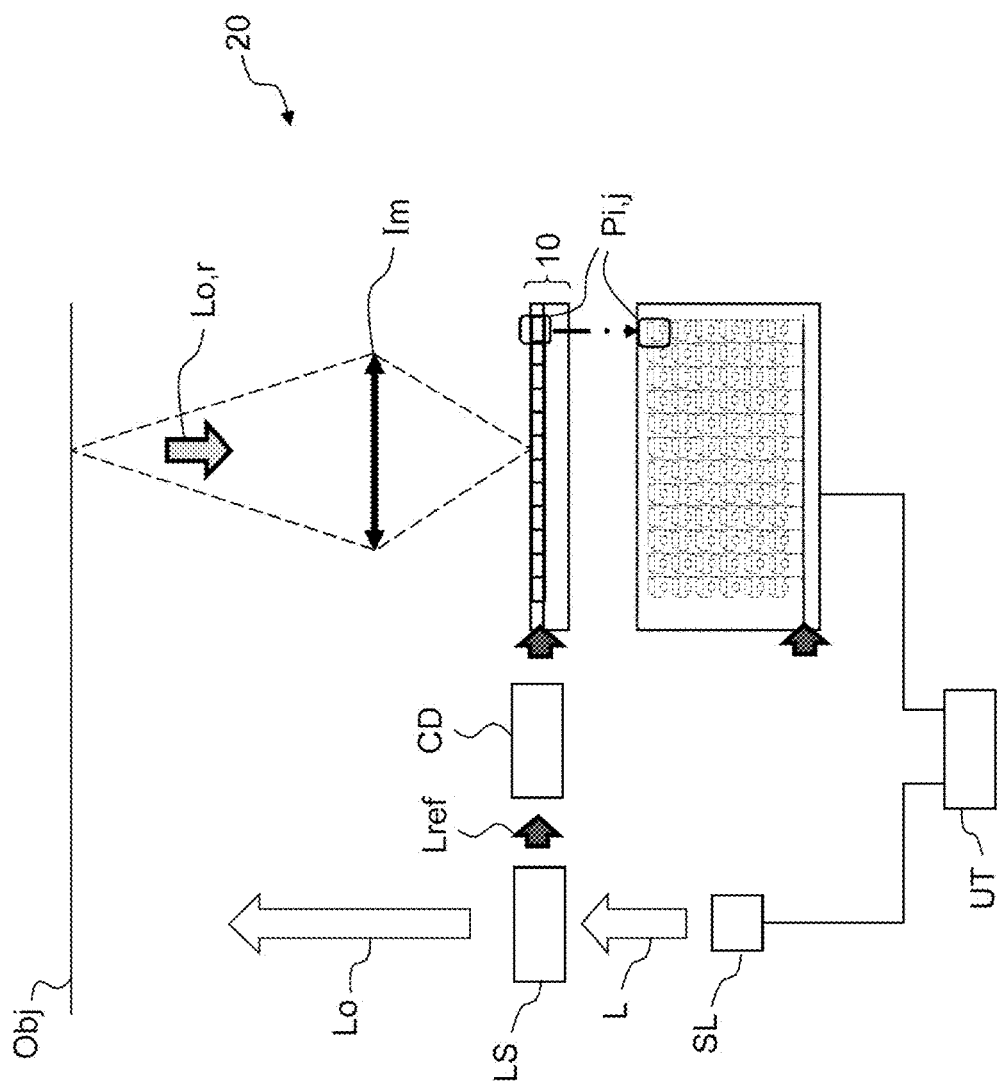
FIG. 14 illustrates a first lidar variant according to another aspect of the invention comprising a detection device according to the invention according to the first variant.

A first variant of a coherent lidar 20 is illustrated in FIG. 14 and comprises a detection device according to the first variant (grating and coupler being two different components). The lidar furthermore comprises a laser source SL configured so as to emit laser radiation L having a temporally modulated optical frequency $F_L$. The laser source is configured such that a coherence length of the source is twice as great, preferably 10 times as great as a predetermined maximum distance zmax between the object furthest from the scene and the lidar. Specifically, it is necessary for the coherence length Ic of the source to be greater than the optical path difference between the object path and the reference path in order to achieve coherent detection. The operating wavelength λ is typically between 0.8 µm and 10 µm. Telecom wavelengths between 1.3 and 1.55 µm, and notably 1.55 µm (with eye safety) are of particular interest. The laser source is for example an edge-emitting laser (EEL), or a vertical-cavity surface-emitting laser (VCSEL), or a quantum cascade laser (QCL). EEL or VCSEL lasers are preferably used for laser emission at a wavelength less than 3 µm, whereas QCLs are preferably used for laser emission at a wavelength greater than 3 µm.

The coherent lidar 20 also comprises a splitter device LS designed to spatially split the laser radiation L into a beam, called reference beam Lref, and into a beam, called object beam Lo, that is directed towards the scene to be observed Obj, and a coupling device CD configured so as to couple the reference beam into the integrated detector. CD is for example an optical fibre.

The lidar also comprises an optical imaging system Im producing an image of the scene by focusing the beam reflected by the scene Lo,r on the detection device 10. The optic Im has a numerical aperture f # designed such that the dimension of the speckle grain (Dg is compatible with the (average) dimension of the diffraction grating dc, as explained further above. An optimum case is when the surface area of the grating is smaller than that of a speckle grain. However, as has been seen above, a wide-aperture optic is desirable, and is therefore possible to go up to:

$$2 \cdot \lambda \cdot f\# \geq dc/2$$

The limit is avoiding two speckle grains being detected by the same grating.

The detection device 10 is placed approximately in the image focal plane of the optical imaging system. According to one embodiment, the optical imaging system has a focal length far smaller than the typical distance between the scene and the detector (in this case, the scene is considered at infinity from the point of view of the optical imaging system). The optical imaging system Im is an objective comprising an aperture diaphragm Diaph defining the physical pupil of the system. The optical imaging system is typically formed of a lens or a plurality of lenses, for example a triple Gauss.

The coherent lidar 20 furthermore comprises a processing unit UT connected to the integrated detector Det and to the laser source SL, and configured so as to determine a distance of points of the scene that are imaged on the pixels of the integrated detector, based on the beat frequency and based on the modulation of the optical frequency of the laser radiation. It may also construct an instantaneous distance image of the scene. Distance image is understood to mean here a map of the distance of the various points of the observed scene, each corresponding to a different pixel.

The processing unit UT also comprises the electronic processing circuit for calculating the beat frequency for each pixel, when it is not located on the integrated detector.

In comparison with an FMCW lidar from the prior art, the lidar 20 according to the invention makes it possible to create an instantaneous image in which all of the points of the scene are measured simultaneously with a measuring start and a measuring end that are identical for all of the pixels, on the condition that the detector Det allows this ("global shutter" operation). "Rolling shutter" operation is also possible, and an image is then acquired row by row, this being slower but allowing smaller pixels to be implemented.

Furthermore, the lidar 20 does not require any beam-steering means for scanning the scene at a rapid rate. For operation at video frame rates, the duration of the measurement may range typically up to 20 ms, thereby relaxing the constraints both in terms of the speed of the imager and in terms of the modulation of the optical frequency to be provided by the source. The lidar according to the invention thus proposes a distance active imaging system with a high spatial resolution (number of points in the image given by the number of pixels), which is robust with respect to ambient stray light, possibly of "global shutter" type, and able to operate at video frame rates.

Moreover, directly injecting the reference beam into the detector considerably simplifies the architecture of the lidar in comparison with conventional lidars.

Figure 15:
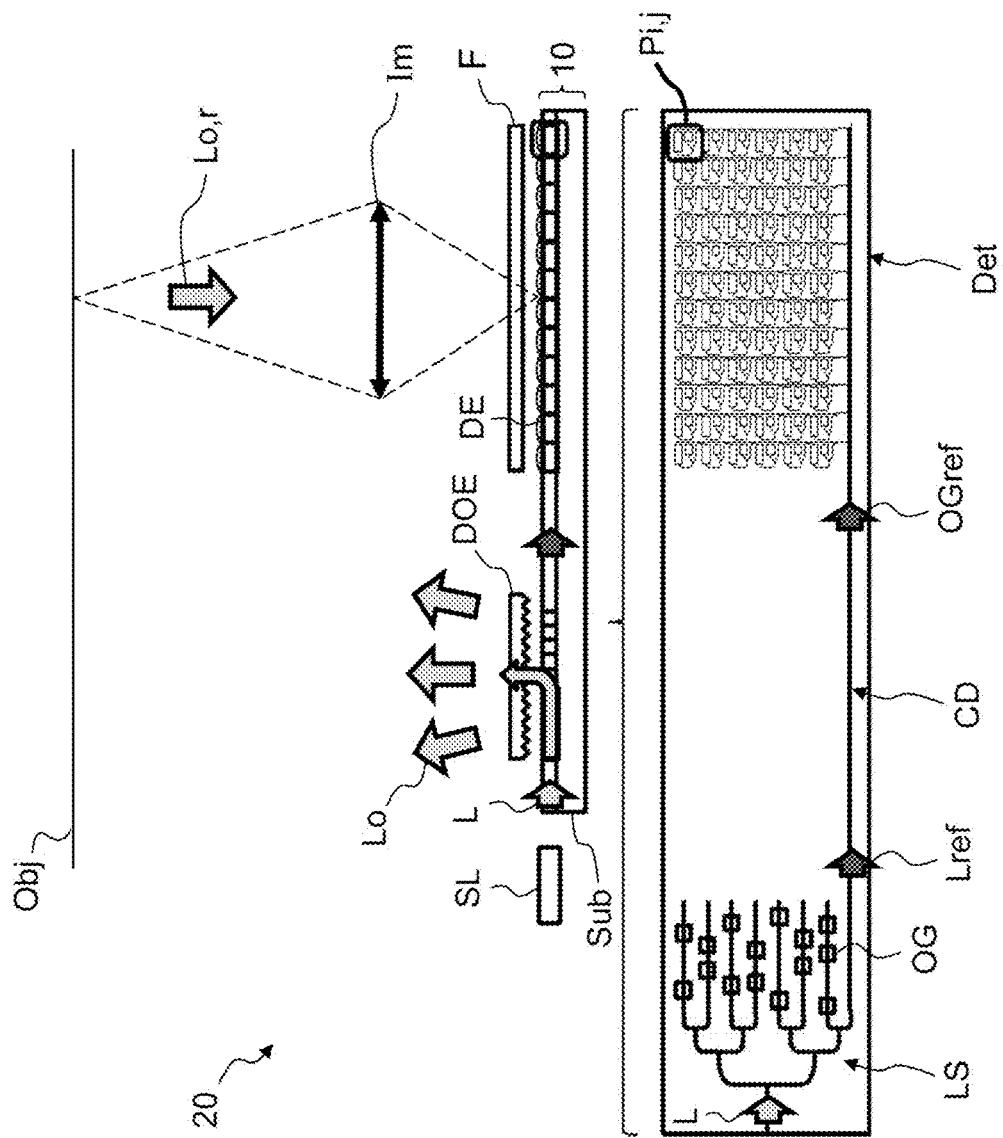
FIG. 15 illustrates one embodiment of the first lidar variant in which the splitter device, the coupling device and the integrated detector are produced on the same substrate.

According to one embodiment illustrated in FIG. 15, the splitter device LS, the coupling device CD and the integrated detector are produced on the same substrate Sub. This makes it possible to avoid flow losses linked to the transportation and coupling of the laser beam into the detector. The splitter device comprises an integrated optical circuit OC subdividing into a plurality of waveguides each comprising at least one diffraction grating, called object grating OG, the object gratings being configured so as to decouple part of the laser beam from the plane of the integrated optical circuit so as to form the object beam, and into at least one waveguide without a grating guiding the reference beam to the detector, and forming the coupling device. It is typically OGref that extends from the circuit OC to the detector.

The lidar also optionally comprises a projection system for projecting light onto a predetermined region of the scene to be observed, the image of which will subsequently be formed on the detector, therefore typically a rectangular region. Preferably, the optical projection system illuminates the scene with a cone of angular aperture that is substantially equal to the field angle of the optical imaging system (which is determined by its focal distance and the size of the detector). Thus, whatever the distance of the scene, its image corresponds to the size of the detector. The optical projection system is preferably designed to illuminate the predetermined region of the scene uniformly in order to subsequently ensure illumination and a signal-to-noise ratio that is uniform on the detector if the scene is Lambertian.

The lidar also optionally comprises a shaping optical device, for example a DOE (diffractive optical element) consisting of periodic patterns with a period of the order of the wavelength of the laser radiation, which is arranged between the circuit OC and the scene in order to allow the uniformity of the illumination to be improved.

Figure 16:
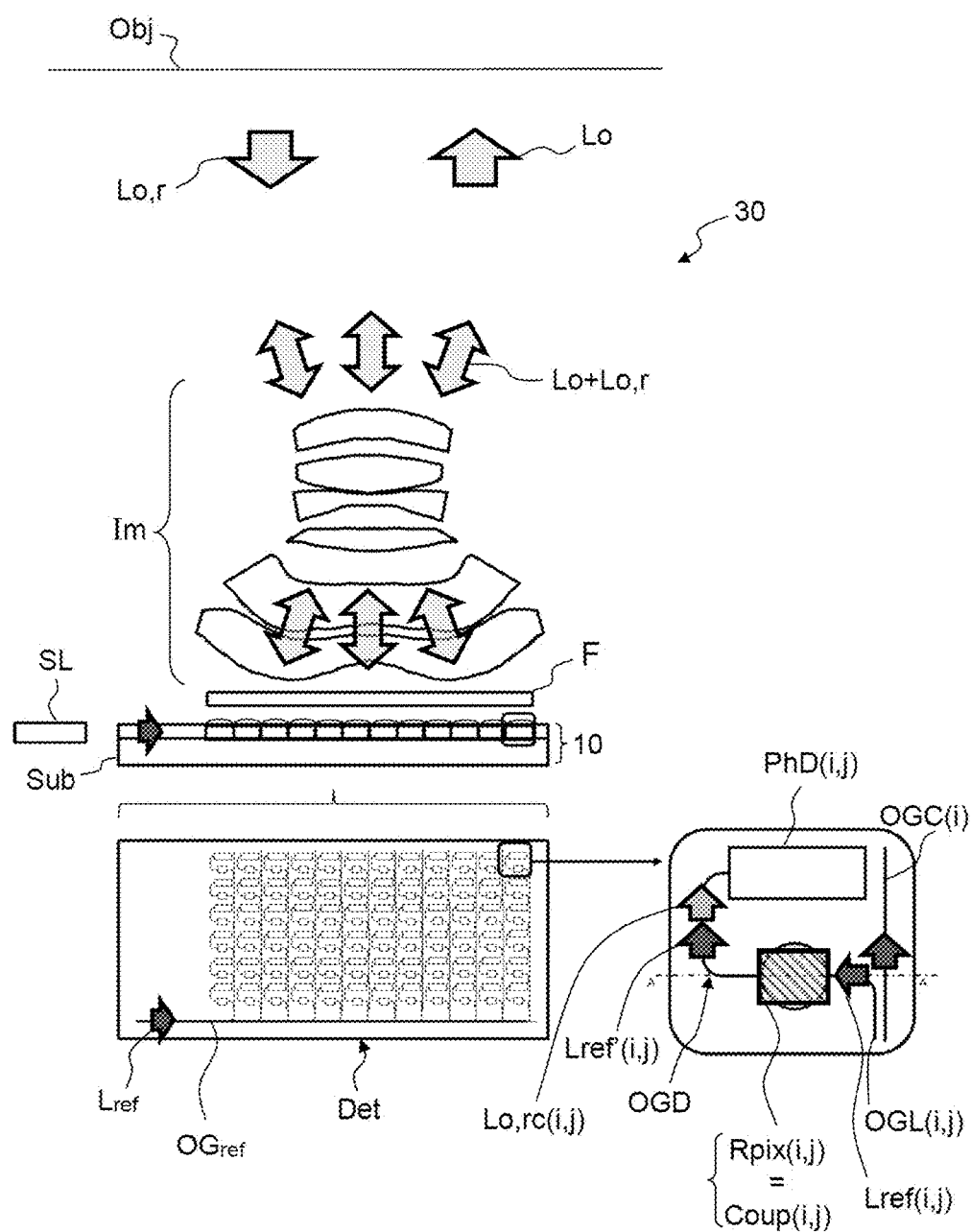
FIG. 16 illustrates a second lidar variant according to another aspect of the invention comprising a detection device according to the invention according to the second variant.

A second variant of a coherent lidar 30 is illustrated in FIG. 16 and comprises a detection device according to the second variant (grating also forming a coupler), so as to perform a dual function of illumination and of coupling the radiation reflected by the scene into the detector. The laser source SL, the imaging system Im and the processing unit have features similar to the previous lidar 20.

This lidar 30 does not comprise a splitter device LS and the coupling/transport device CD (using an optical fibre or integrated optic) for coupling/transporting the radiation from the laser to the detector is optional, this radiation being able to be injected directly into the detector.

In this variant, the optical imaging system Im is passed through (direction from detector towards scene) by the pixel object beams Lo(i,j) from the pixel gratings, which then form the object beam Lo illuminating the scene. The system Im is also passed through in the opposite direction (direction from scene towards detector) by the beam reflected by the scene Lo,r, which is focused on the integrated detector so as to form an illumination beam for each pixel.

This lidar 30 has a simplified architecture in comparison with that of the lidar 20, the illumination function being integrated into the detector.

One dimensioning of the system is given by way of example:
Pixel size: 20 µm
Number of pixels: 320×240 (QVGA format)
Detector size: 6.4×4.8 mm
FOV: 49×38°
Focal length: 7 mm
F #: 2 to 3
λ: 1.55 µm
Φg: 6 to 9 µm
Grating size: 3 to 5 µm In the two lidar systems 20 and 30 according to the invention, the entire scene to be observed is illuminated simultaneously. There is no scanning of the scene with the frequency-modulated beam, and therefore no need to scan the reference beam with the pixels of the detector. It is therefore possible to use passive coupling between the various optical guides of the detection device.

Furthermore, in the two lidar systems 20 and 30 according to the invention, the frequency modulation is performed on the two (reference and object) paths. The beat frequency is low in this case (typically between 10 Hz and 10 MHz, preferably between 50 Hz and 2 MHz), and the photodetection bandwidth is compatible with simplified signal-processing electronics.

The invention claimed is:

1. A detection device for a coherent lidar imaging system comprising an integrated detector (Det) comprising a matrix array of pixels (Pi,j) distributed over N columns and M rows and comprising:
   an optical guide, called reference guide (OGref), configured so as to receive a laser beam, called reference beam,
   N optical guides (OGC(i)), called column guides, coupled to the reference guide, and designed to route part of the reference beam into the N columns of the detector,
   each column guide being coupled to M optical guides (OGL(i,j)), called row guides, respectively associated with the M pixels of the M rows of the detector of said column, the M row guides being configured so as to route part of the reference beam into each pixel of the column, called pixel reference beam (Lref(i,j)), the coupling between the reference guide and the N column guides, as well as the coupling between each column guide and the M associated row guides, being passive, each pixel (Pi,j) of the integrated detector comprising:
      a guided photodiode (PhD(i,j)) coupled to an optical detection guide (OGD(i,j)),
      a diffraction grating, called pixel grating (Rpix(i,j)), configured so as to couple a portion of a beam illuminating the pixel, called pixel coupled beam (Lo,rc(i,j)), into the guided photodiode,
      a coupler, called pixel coupler (Coup(i,j)), configured so as to couple the pixel coupled beam and at least a fraction (Lref'(i,j)) of the pixel reference beam into the detection guide,
   the guided photodiode thus being configured so as to receive said pixel coupled beam and at least said fraction (Lref'(i,j)) of the pixel reference beam,
   an electronic circuit for readout and for preprocessing of a signal detected by the photodiode,
   the preprocessing comprising amplification and filtering, wherein:
   the pixel grating and the pixel coupler are two different components,
   the row guide is connected to the pixel coupler, and
   each pixel furthermore comprising a pixel waveguide (OGpix(i,j)) coupled upstream to the pixel grating and downstream to the pixel coupler and configured so as to route the pixel coupled beam to the pixel coupler.

2. The detection device according to claim 1, furthermore comprising at least one electronic processing circuit configured so as to calculate, for each pixel, a frequency (F(i,j)) of a beat between the pixel reference beam and the pixel coupled beam.

3. The detection device according to claim 2, wherein each pixel comprises its own electronic processing circuit (CE(i,j)) designed to calculate the beat frequency associated with the pixel.

4. The detection device according to claim 2, wherein each column is connected to an electronic processing circuit (CC(i)) configured so as to calculate the beat frequency associated with each pixel of the column.

5. The detection device according to claim 1, wherein the coupling between the reference guide and the N column guides, as well as the coupling between each column guide and the M associated row guides, is evanescent.

6. The detection device according to claim 1, furthermore comprising:
   a matrix array of transmissive deflecting elements (DE), a deflecting element being associated with a pixel or a group of pixels and configured so as to be able to be oriented individually by an electrical signal so as to deflect the one or more beams illuminating the one or more pixels,
   each pixel or pixel group furthermore comprising a control loop (SL) associated with the deflecting element and configured so as to actuate the deflecting element so as to maximize a signal-to-noise ratio (SNR) of the detected signal generated by the guided photodiode.

7. The detection device according to claim 6, wherein the deflecting element is chosen from a prism, a polyhedron, a spherical dome, and a diffractive optical element.

8. The detection device according to claim 6, wherein a distance between the matrix array of deflecting elements and the integrated detector is between one and ten times a lateral dimension of the deflecting element.

9. The detection device according to claim 1, furthermore comprising a matrix array of microlenses associated with the pixel matrix array, a microlens being configured so as to focus the beam illuminating the associated pixel on the pixel grating.

10. The detection device according to claim 1, wherein the pixel coupler is a Y-junction.

11. A detection device for a coherent lidar imaging system comprising an integrated detector (Det) comprising a matrix array of pixels (Pi,j) distributed over N columns and M rows and comprising:
- an optical guide, called reference guide (OGref), configured so as to receive a laser beam, called reference beam,
- N optical guides (OGC(i)), called column guides, coupled to the reference guide, and designed to route part of the reference beam into the N columns of the detector,
- each column guide being coupled to M optical guides (OGL(i,j)), called row guides, respectively associated with the M pixels of the M rows of the detector of said column, the M row guides being configured so as to route part of the reference beam into each pixel of the column, called pixel reference beam (Lref(i,j)), the coupling between the reference guide and the N column guides, as well as the coupling between each column guide and the M associated row guides, being passive,
- each pixel (Pi,j) of the integrated detector comprising:
  - a guided photodiode (PhD(i,j)) coupled to an optical detection guide (OGD(i,j)),
  - a diffraction grating, called pixel grating (Rpix(i,j)), configured so as to couple a portion of a beam illuminating the pixel, called pixel coupled beam (Lo,rc(i,j)), into the guided photodiode,
  - a coupler, called pixel coupler (Coup(i,j)), configured so as to couple the pixel coupled beam and at least a fraction (Lref(i,j)) of the pixel reference beam into the detection guide,
  - the guided photodiode thus being configured so as to receive said pixel coupled beam and at least said fraction (Lref' (i,j)) of the pixel reference beam,
- an electronic circuit for readout and for preprocessing of a signal detected by the photodiode, the preprocessing comprising amplification and filtering, wherein:
  - the pixel grating is also the pixel coupler,
  - the pixel grating is coupled upstream to the row guide and downstream to the detection guide, so as to route said fraction of the pixel reference beam (Lref' (i,j)) into the detection guide,
  - the pixel grating furthermore being configured so as to couple another fraction of the pixel reference beam, called pixel object beam (Lo(i,j)), into free space, in at least one direction opposite that of the beam illuminating the pixel.

12. A coherent lidar imaging system comprising:
- a detection device according to claim 1,
- at least one electronic processing circuit configured so as to calculate, for each pixel, a beat frequency (F(i,j)) of a beat between the pixel reference beam and the pixel coupled beam,
- a laser source (SL) configured so as to emit laser radiation (L) having a temporally modulated optical frequency (FL),
- a splitter device (LS) designed to spatially split the laser radiation (L) into a beam, called reference beam (Lref), and into a beam, called object beam (Lo), that is directed towards the scene to be observed (Obj),
- a coupling device (CD) configured so as to couple the reference beam into the integrated detector,
- an optical imaging system (Im) producing an image of the scene by focusing a beam reflected by the scene (Lo,r) on the detection device,
- a processing unit (UT) connected to the integrated detector and to the laser source, the processing unit being configured so as to determine a distance of points of the scene that are imaged on the pixels of the integrated detector, based on the beat frequency.

13. The system according to claim 12, wherein the splitter device (LS), the coupling device (CD) and the integrated detector are produced on the same substrate (Sub), the splitter device comprising an integrated optical circuit (OC) subdividing into a plurality of waveguides each comprising at least one diffraction grating, called object grating (OG), the object gratings being configured so as to decouple part of the laser beam from the plane of the integrated optical circuit so as to form the object beam, and into at least one waveguide without a grating guiding the reference beam to the detector, and forming the coupling device.

14. A coherent lidar imaging system comprising:
- a detection device according to claim 11,
- at least one electronic processing circuit configured so as to calculate, for each pixel, a beat frequency (F(i,j)) of a beat between the pixel reference beam and the pixel coupled beam,
- a laser source (SL) configured so as to emit laser radiation (L), having a temporally modulated optical frequency ($F_L$), and coupled to the integrated detector, the laser radiation coupled into the integrated detector forming the reference beam,
- an optical imaging system (Im) producing an image of a scene (Obj) to be observed on the integrated detector (Det),
- a superposition of the pixel object beams (Lo(i,j)) from the pixel gratings and passing through the optical imaging system forming an object beam (Lo) illuminating the scene, and a beam reflected by the scene (Lo,r) and focused on the integrated detector forming an illumination beam for each pixel,
- the imaging system furthermore comprising a processing unit (UT) connected to the integrated detector and to the laser source, the processing unit being configured so as to determine a distance of points of the scene that are imaged on the pixels of the detector, based on the beat frequency.

15. The detection device according to claim 11, furthermore comprising at least one electronic processing circuit configured so as to calculate, for each pixel, a frequency (F(i,j)) of a beat between the pixel reference beam and the pixel coupled beam.

16. The detection device according to claim 15, wherein each pixel comprises its own electronic processing circuit (CE(i,j)) designed to calculate the beat frequency associated with the pixel.

17. The detection device according to claim 15, wherein each column is connected to an electronic processing circuit (CC(i)) configured so as to calculate the beat frequency associated with each pixel of the column.

18. The detection device according to claim 11, wherein the coupling between the reference guide and the N column guides, as well as the coupling between each column guide and the M associated row guides, is evanescent.

19. The detection device according to claim 11, furthermore comprising:
- a matrix array of transmissive deflecting elements (DE),
  - a deflecting element being associated with a pixel or a group of pixels and configured so as to be able to be oriented individually by an electrical signal so as to deflect the one or more beams illuminating the one or more pixels,
- each pixel or pixel group furthermore comprising a control loop (SL) associated with the deflecting element and configured so as to actuate the deflecting element so as to maximize a signal-to-noise ratio (SNR) of the detected signal generated by the guided photodiode.

20. The detection device according to claim 19, wherein the deflecting element is chosen from a prism, a polyhedron, a spherical dome, and a diffractive optical element.

21. The detection device according to claim 19, wherein a distance between the matrix array of deflecting elements and the integrated detector is between one and ten times a lateral dimension of the deflecting element.

22. The detection device according to claim 11, furthermore comprising a matrix array of microlenses associated with the pixel matrix array, a microlens being configured so as to focus the beam illuminating the associated pixel on the pixel grating.

* * * * *